United States Patent
Ogino et al.

(10) Patent No.: US 6,411,430 B1
(45) Date of Patent: Jun. 25, 2002

(54) OPTICAL AMPLIFIER

(75) Inventors: Atsushi Ogino; Masaru Fukushima; Yoshihiro Emori; Haruki Ogoshi; Yoshio Tashiro, all of Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 09/587,362

(22) Filed: Jun. 2, 2000

Related U.S. Application Data

(63) Continuation of application No. PCT/JP99/05413, filed on Oct. 1, 1999.

(51) Int. Cl.[7] .................................................. H01S 3/00
(52) U.S. Cl. ........................... 359/337.11; 359/337.13; 359/341.41; 359/341.42; 372/6; 372/34
(58) Field of Search ................................ 359/161, 187, 359/337, 341, 337.11, 337.13, 341.41, 341.42; 372/6, 29, 34

(56) References Cited

U.S. PATENT DOCUMENTS

| | | | | |
|---|---|---|---|---|
| 5,812,572 A | * | 9/1998 | King et al. ..................... | 372/6 |
| 5,963,361 A | * | 10/1999 | Taylor et al. ................ | 359/337 |
| 6,025,947 A | * | 2/2000 | Lugaya et al. .............. | 359/337 |
| 6,122,085 A | * | 9/2000 | Bitler .......................... | 359/187 |
| 6,122,302 A | * | 9/2000 | Dean ........................... | 359/161 |
| 6,134,047 A | * | 10/2000 | Flood et al. ................. | 359/341 |

OTHER PUBLICATIONS

Jolley et al, OFC '97 Technical Digest, pp. 134–135, Article WF7.*
Kinoshita et al, OSA Trends in Optics and Photonics, vol. 25, pp. 280–283.*

* cited by examiner

Primary Examiner—Nelson Moskowitz
(74) Attorney, Agent, or Firm—Oblon, Spivak, McClelland, Maier & Neustadt, P.C.

(57) ABSTRACT

In an optical amplifier having a plurality of rare earth doped optical fibers in a multi-stage, there are provided one or more optical variable attenuator means, and an attenuation amount control means for changing an optical attenuation amount of the optical variable attenuator means on the basis of temperature of the rare earth doped optical fibers or an environmental temperature. In an optical amplifier having a plurality of rare earth doped optical fibers in a multi-stage, between the rare earth doped optical fibers, there are provided a replaceable optical part, one or more optical variable attenuator means, and an attenuation amount control means for changing an optical attenuation amount of the optical variable attenuator means on the basis of temperature of the rare earth doped optical fibers or an environmental temperature. In an optical amplifier having a plurality of rare earth doped optical fibers in a multi-stage, one or more externally controllable optical variable attenuator means are provided, and an optical attenuation amount of the optical variable attenuator means is varied with intensity of input optical signal to the optical amplifier and intensity of output optical signal from the optical amplifier.

17 Claims, 37 Drawing Sheets

OPTICAL AMPLIFIER

This application is a continuation of International PCT Application No. PCT/JP99/05413 filed on Oct. 1, 1999.

BACKGROUND OF THE INVENTION

1. Field of the Invention

The present invention relates to an optical amplifier mainly used in an optical communication system and suitable for amplifying a wavelength-division multiplexed optical signal having a band of 1.5 μm.

2. Related Background Art

In optical fiber communication systems, rare earth doped optical fiber amplifiers (referred to merely as "optical amplifiers" hereinafter) have remarkably been developed. Particularly, a D-WDM system in which a wide amplifying band of the optical amplifier is utilized and a communication capacity is increased by using wavelength-division multiplexed optical signals obtained by multiplexing a plurality of optical signals in the amplifying band has mainly been progressed. However, although the optical amplifier has the wide amplifying band, an amplifying property thereof has wavelength dependency, input intensity dependency and temperature dependency.

Thus, when the wavelength-division multiplexed optical signals are amplified collectively, there arises a problem regarding difference in gain between the respective different optical signal wavelengths (referred to as "channels" hereinafter). That is to say, in the D-WDM system, when the optical amplifiers are connected in a multi-stage fashion, the gain differences between the channels are accumulated, thereby causing great output signal intensity difference ultimately. Since the transmission property of the entire optical transmitting system is limited by a channel having minimum output signal intensity, even when there are channels having greater output signal intensity, the transmission property of the entire optical transmitting system will be reduced.

To solve this problem, various techniques have been developed. As one of these techniques, there is means for controlling a temperature of the entire rare earth doped optical fibers to keep the temperature constant in order to eliminate the temperature dependency. However, the means for controlling the temperature of the rare earth doped optical fibers increases power consumption and makes the entire system bulky, and, increase in the used temperature range results in additional increase in power consumption.

Further, there is gain constant control means for keeping the gain constant by adjusting output intensity in accordance with input intensity after gain spectrum is flattened by inserting a correction filter into an optical amplifier portion in order to eliminate the wavelength dependency from the amplifying property. FIG. 44 shows an example of an optical amplifier utilizing such means. In the optical amplifier shown in FIG. 44, optical fiber amplifiers are connected in a two-stage fashion. The optical amplifier comprises an input optical connector $1a$, an output optical connector $1b$, optical couplers or beam splitters $2a$, $2b$, $2c$, $2d$, optical monitors PD $3a$, $3b$, $3c$, $3d$, optical isolators $4a$, $4b$, $4c$, $4d$, pumping light/optical signal wavelength-division multiplexers $5a$, $5b$, $5c$, pumping light sources $6a$, $6b$, $6c$, rare earth doped optical fibers (optical fiber amplifiers) $7a$, $7b$, an optical variable attenuator $8$, and optical signal gain constant pumping light source control circuits $9a$, $9b$. In this optical amplifier, a part of input optical signal outputted from the input optical connector $1a$ is picked up by the beam splitter $2a$ and light intensity thereof is measured by the optical monitor PD $3a$. The optical signal passes through the optical isolator $4a$ and is incident on the optical fiber amplifier $7a$ which is now maintained in a pumping condition by the pumping light source $6a$. In this optical fiber amplifier, the optical signal is subjected to optical amplification by stimulated emission. The optical-amplified optical signal passes through the optical isolator $4b$, and a part of the light is picked up by the beam splitter $2b$ and light intensity thereof is measured by the optical monitor PD $3b$. The pumping light source $6a$ is adjusted by the optical signal gain constant pumping light source control circuit (AGC) $9a$ so that a ratio between the input optical signal of the optical monitor PD $3a$ and the output optical signal of the optical monitor PD $3b$ becomes a constant value. The optical signal passed through the first stage passes through the optical variable attenuator $8$ and is incident on the second stage. The second stage is operated in the similar manner to the first stage, so that the signals of the optical monitors PD $3c$, $3d$ are compared by the optical signal gain constant pumping light source control circuit (AGC) $9b$, and the pumping light sources $6b$, $6c$ are controlled so that a ratio therebetween becomes a constant value. As a result, even if the light intensity of the input signal is changed, gain spectrums of the optical fiber amplifiers in the first and second stages are kept constant.

However, in the optical amplifier utilizing the gain constant control means as shown in FIG. 44, since the intensity of the pumping light is varied with the light intensity of the input signal, in a small input optical signal area within the operation input optical signal intensity range, the intensity of the pumping light becomes small, thereby deteriorating noise figure. Further, since the intensity of the pumping light is greatly changed, the first stage of the gain constant control requires forward pumping or bi-directional pumping.

In consideration of the above, an object of the present invention is to provide an optical amplifier of multi-stage type having a plurality of rare earth doped optical fibers and in which temperature dependency of gain spectrum can be compensated so as to be operated with constant gain spectrum regardless of used temperature. Another object of the present invention is to provide an optical amplifier which can be operated with constant gain spectrum regardless of intensity of input optical signal, insertion loss of parts between stages and light intensity of output optical signal. A further object of the present invention is to provide an optical amplifier in which noise figure is improved in a small optical signal area within an operation input optical signal range, and a gain configuration is kept constant regardless of intensity of input optical signal, and output variable control can be performed.

SUMMARY OF THE INVENTION

According to a first aspect of the present invention, there is provided an optical amplifier having a plurality of rare earth doped optical fibers in a multi-stage and comprising one or more optical variable attenuator means, and an attenuation amount control means for changing an optical attenuation amount of the optical variable attenuator means on the basis of temperature of the rare earth doped optical fibers or an environmental temperature.

According to a second aspect of the present invention, there is provided an optical amplifier having a plurality of rare earth doped optical fibers in a multi-stage and comprising, a replaceable optical part between the rare earth doped optical fibers, one or more optical variable attenuator means, and an attenuation amount control means for changing an optical attenuation amount of the optical variable attenuator means on the basis of temperature of the rare earth doped optical fibers or an environmental temperature.

According to a third aspect of the present invention, in the optical amplifier according to the first or second aspect, the attenuation amount control means has an optical attenuation amount table associated with the temperature, and the optical attenuation amount of the optical variable attenuator means is changed on the basis of the optical attenuation amount table.

According to a fourth aspect of the present invention, in the optical amplifier according to the third aspect, when an equation obtained by applying the regression line based on the method of least squares to the optical attenuation amount table is represented by "optical attenuation amount= coefficient A [dB/° C.]×temperature [° C.]+any coefficient", the coefficient A is selected to be within a range from −0.16 [dB/° C.] to +0.26 [dB/° C.].

According to a fifth aspect of the present invention, in the optical amplifier according to the third aspect, a wavelength band of optical signal inputted to the optical amplifier is 1580 to 1590 nm, and, when an equation obtained by applying the regression line based on the method of least squares to the optical attenuation amount table is represented by "optical attenuation amount=coefficient A [dB/° C. ]×temperature [° C.]+any coefficient", the coefficient A is selected to be within a range from −0.16 [dB/° C.] to −0.04 [dB/° C. ].

According to a sixth aspect of the present invention, in the optical amplifier according to any one of first to fifth aspects, the attenuation amount control means changes the optical attenuation amount of the optical variable attenuator means by using one or plural or all of intensity of input optical signal to the optical amplifier, an insertion loss amount of the replaceable optical part and intensity of output light from the optical amplifier, as well as the temperature.

According to a seventh aspect of the present invention, there is provided an optical amplifier having a plurality of rare earth doped optical fibers in a multi-stage and comprising one or more externally controllable optical variable attenuator means, and an optical attenuation amount of the optical variable attenuator means is varied with intensity of input optical signal to the optical amplifier and intensity of output light from the optical amplifier.

According to an eighth aspect of the present invention, in the optical amplifier according to the seventh aspect, an optical fiber amplifier in a first stage is subjected to pumping light intensity constant control or pumping current constant control, and optical fiber amplifiers in stages other than the first and last stages are subjected to any control other than gain constant control, and gain spectrum of the entire optical amplifier is made constant by controlling an optical fiber amplifier in the last stage and the optical variable attenuator means between the optical fiber amplifier stages.

According to a ninth aspect of the present invention, in the optical amplifier according to the seventh or eighth aspect, it comprises an optical attenuation amount table associated with the intensity of input optical signal to the optical amplifier and the intensity of output optical signal from the optical amplifier, and the optical attenuation amount is changed in accordance with the table.

According to a tenth aspect of the present invention, in the optical amplifier according to the ninth aspect, a relationship between the intensity of input optical signal to the optical amplifier, intensity of output optical signal from the optical amplifier and optical attenuation amount of the optical variable attenuator means is represented by "optical attenuation amount=coefficient A ×(intensity of output optical signal from the optical amplifier−intensity of input optical signal to the optical amplifier) [dB]+any coefficient", and the coefficient A has a value within a range from −0.8 [dB/dB] to −1.1 [dB/dB].

In the optical amplifier according to the present invention, the rare earth doped optical fibers in the last stage may be subjected to output constant control.

In the optical amplifier according to the present invention, the rare earth doped optical fibers in the first stage may be subjected to pumping light output constant control.

In the optical amplifier according to the present invention, the attenuation amount control means may have an optical attenuation amount table associated with the intensity of input optical signal to the optical amplifier, insertion loss amount of the replaceable optical part and intensity of output optical signal from the optical amplifier, and the optical attenuation amount of the optical variable attenuator means may be changed on the basis of information derived from the table and the temperature.

In the optical amplifier according to the present invention, when an equation obtained by applying the regression line based on the method of least squares to the optical attenuation amount table associated with the intensity of input optical signal to the optical amplifier, insertion loss amount of the replaceable optical part and intensity of output optical signal from the optical amplifier is represented by "optical attenuation amount=coefficient B [dB/dB]×(intensity of output optical signal from the optical amplifier−intensity of input optical signal to the optical amplifier+insertion loss amount of the replaceable optical part)[dB]+any coefficient", the coefficient B may be selected to be within a range from −0.8 [dB/dB] to −1.2 [dB/dB].

BEST MODE FOR CARRYING OUT THE INVENTION

First Embodiment

Figure 1:
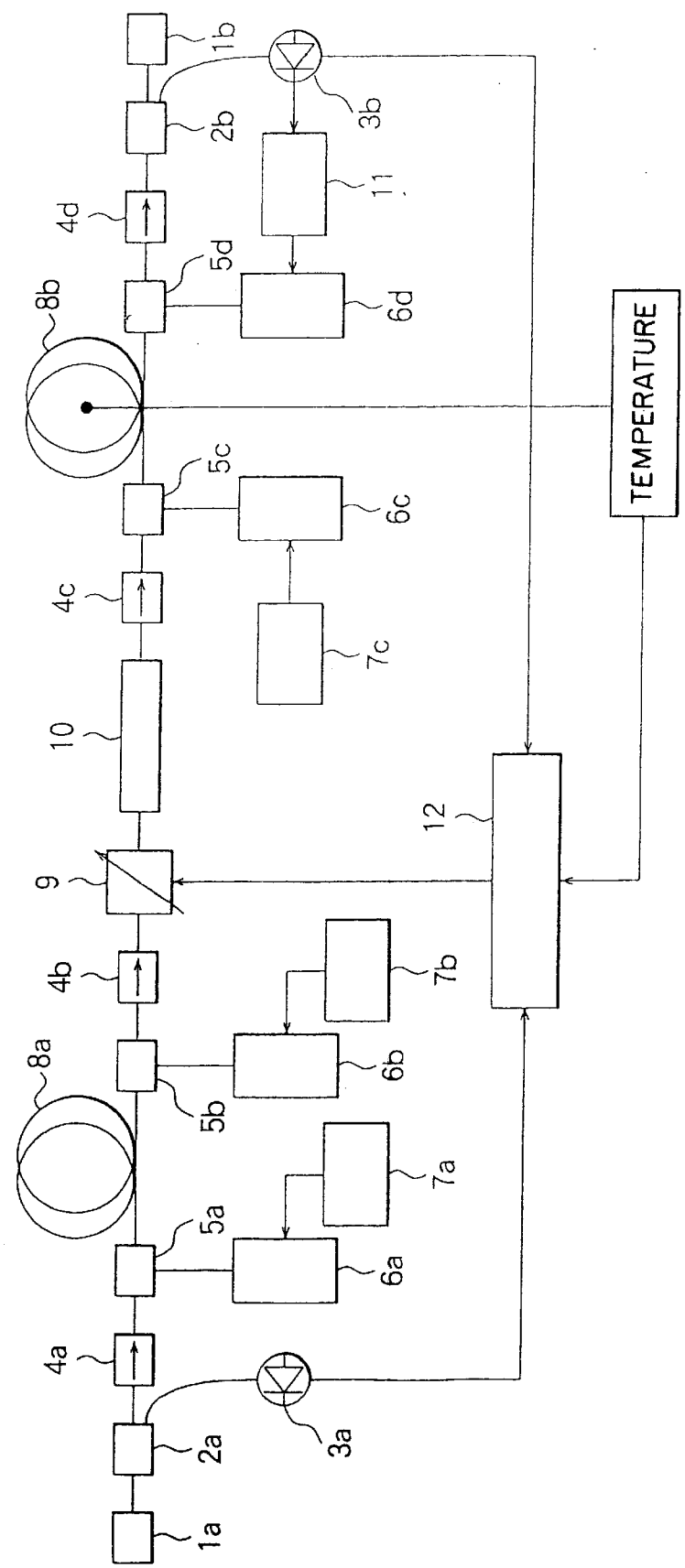
FIG. 1 is a circuit diagram showing an optical amplifier according to a first embodiment of the present invention.

FIG. 1 shows an optical amplifier according to a first embodiment of the present invention. The optical amplifier is of two-stage type and comprises an input optical connector 1a, an output optical connector 1b, optical couplers or beam splitters 2a, 2b, optical signal monitors PD 3a, 3b, optical isolators 4a, 4b, 4c, 4d, pumping light/optical signal wavelength-division multiplexers 5a, 5b, 5c, 5d, pumping light sources 6a, 6b, 6c, 6d, pumping light output constant control circuits (APC) 7a, 7b, 7c, rare earth doped optical fibers 8a, 8b, an optical variable attenuator (optical variable attenuator means) 9, an optical part (replaceable optical part) 10, an optical signal output constant control circuit 11, and a calculation control circuit (attenuation amount control means) 12.

In FIG. 1, a part of optical signal (wavelength-division multiplexed optical signal) outputted from the input optical connector 1a is picked up by the optical coupler or beam splitter 2a and light intensity thereof is measured by the optical signal monitor 3a. On the other hand, the optical signal passed through the optical coupler or beam splitter 2a passes through the optical isolator 4a and the pumping light/optical signal wavelength-division multiplexer 5a and is incident on the rare earth doped optical fiber 8a which is now maintained in a pumping condition by pumping light generated by the pumping light source 6a (output of which is kept constant by the pumping light output constant control circuit (APC) 7a) and combined by the pumping light/optical signal wavelength-division multiplexer 5a and by pumping light generated by the pumping light source 6b (output of which is kept constant by the pumping light output constant control circuit (APC) 7b) and combined by the pumping light/optical signal wavelength-division multiplexer 5b. In this optical fiber, the optical signal is subjected to optical amplification by stimulated emission. The optical-amplified optical signal is incident on the optical isolator 4b. The optical signal passed through the optical isolator 4b is attenuated by the optical variable attenuator 9 an optical attenuation amount of which is variably controlled and is incident on the optical part 10. The optical signal passed through the optical part 10 is directed to the subsequent second stage optical amplifying portion, where the optical signal is amplified. That is to say, the optical signal passed through the optical isolator 4c and the pumping light/optical signal wavelength-division multiplexer 5c is incident on the rare earth doped optical fiber 8b which is now maintained in a pumping condition by pumping light generated by the pumping light source 6c (output of which is kept constant by the pumping light output constant control circuit (APC) 7c) and combined by the pumping light/optical signal wavelength-division multiplexer 5c and by pumping light generated by the pumping light source 6d (which is controlled by the optical signal output constant control circuit 11 to keep the optical signal output of the entire optical amplifier constant) and combined by the pumping light/optical signal wavelength-division multiplexer 5d. In this optical fiber, the optical signal is subjected to optical amplification by stimulated emission. The optical-amplified is incident on the optical isolator 4d. A part of the optical signal passed through the optical isolator 4d is picked up by the optical coupler or beam splitter 2b and light intensity thereof is measured by the optical signal monitor 3b. The output optical connector 1b emits the amplified optical signal. The light intensities measured in the optical signal monitors 3a, 3b are converted into control signals and are inputted to the calculation control circuit 12, together with a signal from a temperature sensor (not shown).

Figure 29A:
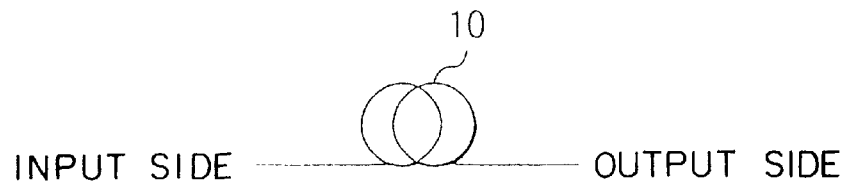
FIGS. 29A to 29C are views showing various optical parts.
Figure 29B:
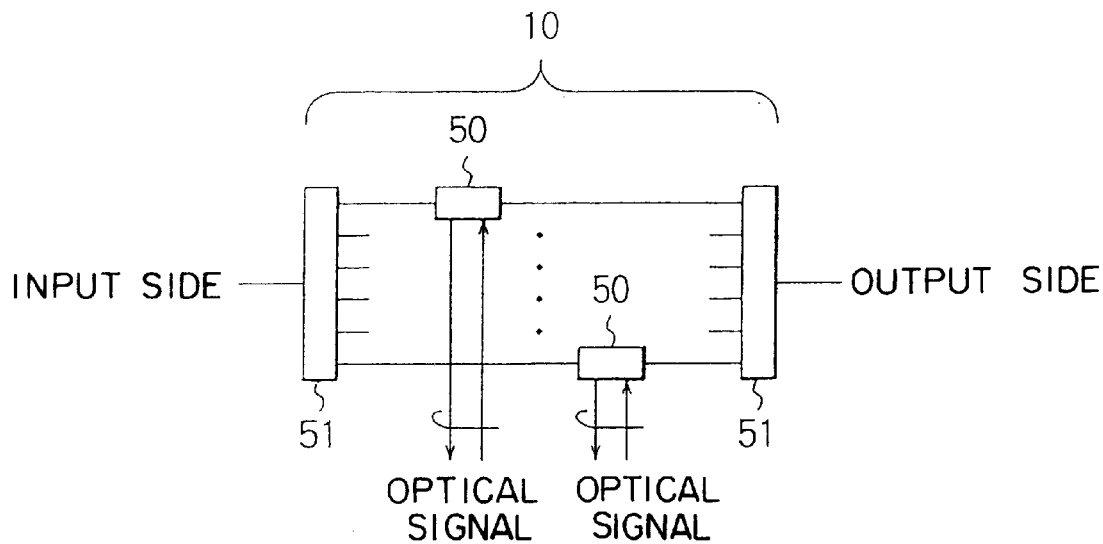
Figure 29C:
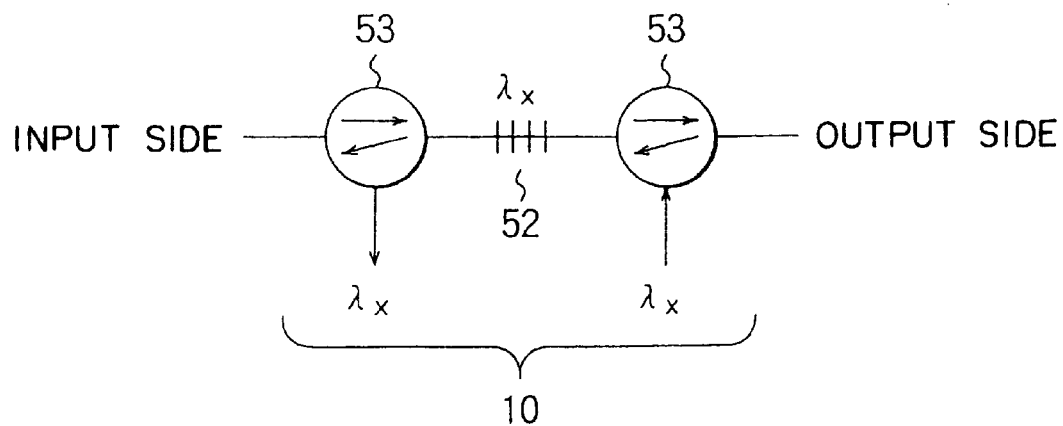

The optical part (replaceable optical part) 10 shown in FIG. 1 can be used to be inserted between the optical amplifier stages when it is desired to impart a dispersion compensating function or an optical AMD (add-drop-multiplexer) function to the amplifier. The optical part may be, for example, a Dispersion Compensating Fiber (DCF) 10 shown in FIG. 29A, an optical AMD (add-drop-multiplexer) 10 constituted by a demultiplexer 51 and an optical switch 50 as shown in FIG. 29B or a combination of a fiber grating 52 and an optical circulator 53. Incidentally, in FIG. 1, the optical part 10 is inserted between the rare earth doped optical fibers 8a constituting the preceding stage amplifying portion and the rare earth doped optical fibers 8b constituting the following stage amplifying portion. If the dispersion compensating function and the optical AMD function are not required, the optical part 10 can be eliminated.

The calculation control circuit 12 shown in FIG. 1 includes an optical attenuation amount table (FIGS. 7, 10, 11, 12 and 15) (which will be fully described later) for changing the attenuation amount of the optical variable attenuator 9 and is adapted to receive the signals from the temperature sensor (not shown) and the optical signal monitors PD 3a, 3b to change the optical attenuation amount of the optical variable attenuator 9 on the basis of EDF temperature, input optical signal intensity, insertion loss amount of the optical part (this loss amount is also inputted to the calculation control circuit 12 as information) and output optical signal intensity. Incidentally, although the temperature sensor can most preferably detect the EDF temperature, a sensor for detecting a temperature of a frame of the optical amplifier or a temperature of an environment where the optical amplifier is installed may be used. The temperature information may be information from factors reflecting change in temperature around the optical amplifier (such as voltage applied to a temperature-adjusting Peltier element for a pumping laser), as well as information from the temperature sensor.

The optical variable attenuator 9 shown in FIG. 1 is an optical part in which an optical attenuation amount thereof is changed by an external signal (control signal from the calculation control circuit 12). Incidentally, if other optical parts (optical part 10 shown in FIG. 1 and other optical parts) have a property that the light loss amount is changed in accordance with the temperature, the value of the optical variable attenuator 9 can be reduced or be made to zero (0). In this case, the temperature correcting optical variable attenuator value becomes a sum of "temperature changing amount of other optical part" and "new temperature correcting optical variable attenuator value".

(Operating Principle)

Figure 3:
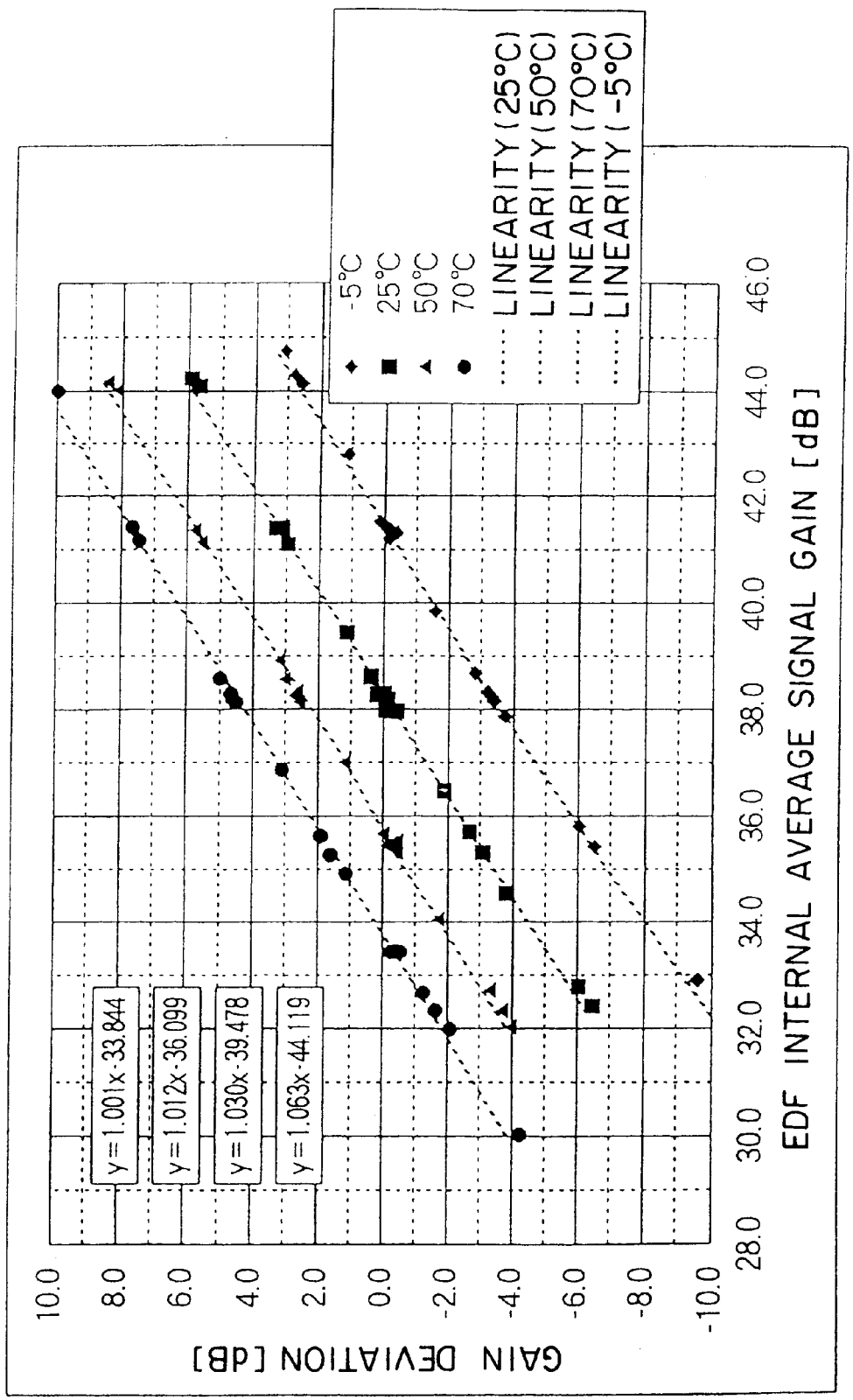
FIG. 3 is a graph showing a relationship between gain deviation and internal average signal gain in the amplifier of FIG. 1.

Now, an operating principle of the optical amplifier according to the present invention will be described. Here, it is assumed that each of the pumping light sources 6a, 6b, 6c, 6d shown in FIG. 1 has a band of 1480 nm, each of the rare earth doped optical fibers 8a, 8b is an erbium doped silica fiber, the optical part 10 is a part having an insertion loss amount of 2 dB, and the optical amplifier is constituted by erbium doped silica fiber amplifiers (EDFA) each having a band of 1570 to 1600 nm. FIG. 3 shows a relationship between gain deviation and EDFA internal average signal gain in the optical amplifier. The abscissa indicates EDFA internal average signal gain $G^{ave}$ represented by the following equation, and the ordinate indicates gain deviation $\Delta G$ represented by $\Delta G = G_1 - G_N$ (1 and N are channel number of the optical signal, and 1 denotes the shortest wavelength light and N denotes the longest wavelength light). For example, when eight wavelength lights are multiplexed, N becomes 8.

$$G^{ave} = 10 \times \log_{10}\left(\sum_{i=1}^{N} \frac{\exp\left(\frac{P_i^{out} - P_i^{in}}{10}\right)}{N}\right) + ATT + ISL$$

Where, the variables in the above equation are as follows:
$G^{ave}$ is EDFA internal average signal gain [dB]
$P_i^{in}$ is input intensity of i-channel
$P_i^{out}$ is output intensity of i-channel
ATT is an attenuation amount of the optical variable attenuator (positive in the attenuating direction).
ISL is loss amount of replaceable optical part (positive in the attenuating direction)

Various points in FIG. 3 indicate a relationship between the EDFA internal average signal gain $G^{ave}$ and the gain deviation $\Delta G$ when the input intensity $P_i^{in}$, output intensity $P_i^{out}$, attenuation amount ATT and loss amount ISL are variously changed and the results are shown by different marks at EDF temperatures of −5° C., 25° C., 50° C. and 70°

C., respectively. Further, regression line equations sought by the method of least squares and regression lines are also shown for respective temperatures. From, FIG. 3, it can be seen that even if the EDF temperature is changed, the gain deviation ΔG can be kept constant by changing the EDFA internal average signal gain $G^{ave}$.

Figure 4:
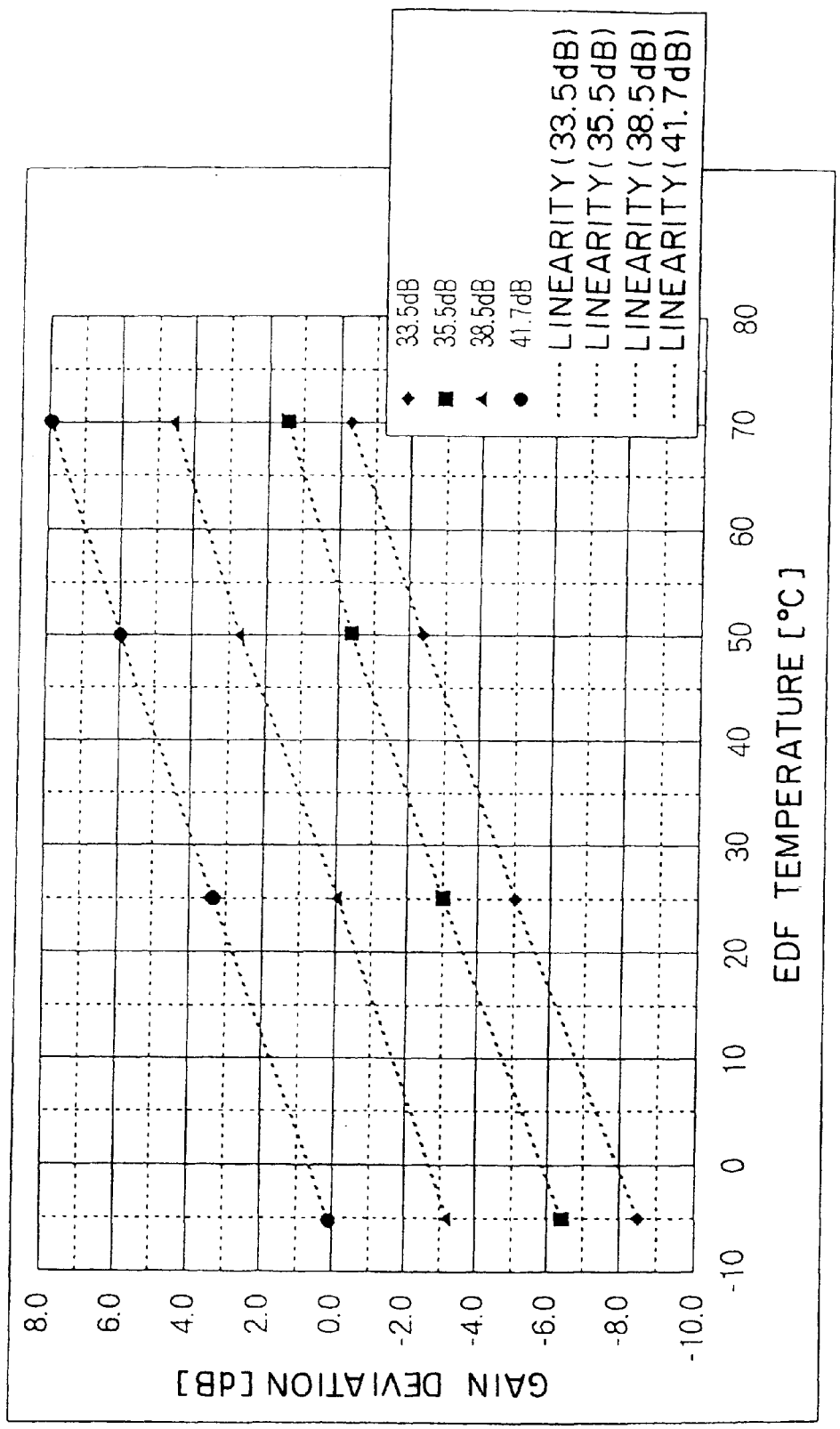
FIG. 4 is a graph showing a relationship between gain deviation and EDF temperature in the amplifier of FIG. 1.

FIG. 4 shows a relationship between the gain deviation ΔG and the EDF temperature property. As shown by the regression lines for the respective EDFA internal average signal gains $G^{ave}$ (33.5 dB, 35.5 dB, 38.5 dB, 41.7 dB), the change in gain deviations ΔG with respect to the EDF temperature are substantially linear. That is to say, when the gain deviation ΔG is kept constant with respect to the change in EDF temperature, the relationship between the EDF temperature and the EDFA internal average signal gain $G^{ave}$ becomes substantially linear. When the input intensity $P_i^{in}$, output intensity $P_i^{out}$, gain deviation ΔG and loss amount ISL are fixed, in order to keep the EDFA internal average signal gain $G^{ave}$ constant with respect to the change in EDF temperature, an amount corresponding to the change in EDFA internal average signal gain $G^{ave}$ may be cancelled by the attenuation amount ATT of the optical variable attenuator 9. Further, From FIG. 3, it can be seen that, regarding the same EDF temperature, the operation in which the gain deviation ΔG is fixed can be realized by keeping the EDFA internal average signal gain $G^{ave}$ constant. Thus, by controlling the attenuation amount ATT of the same optical variable attenuator 9 so that the gain deviation ΔG is kept constant by changing the EDFA internal average signal gain $G^{ave}$ with respect to the change in EDF temperature and that the EDFA internal average signal gain $G^{ave}$ is kept constant with respect to the change in input intensity $P_i^{in}$, output intensity $P_i^{out}$ and loss amount ISL, the operation in which the gain deviation ΔG is fixed can always be realized.

Figure 5:
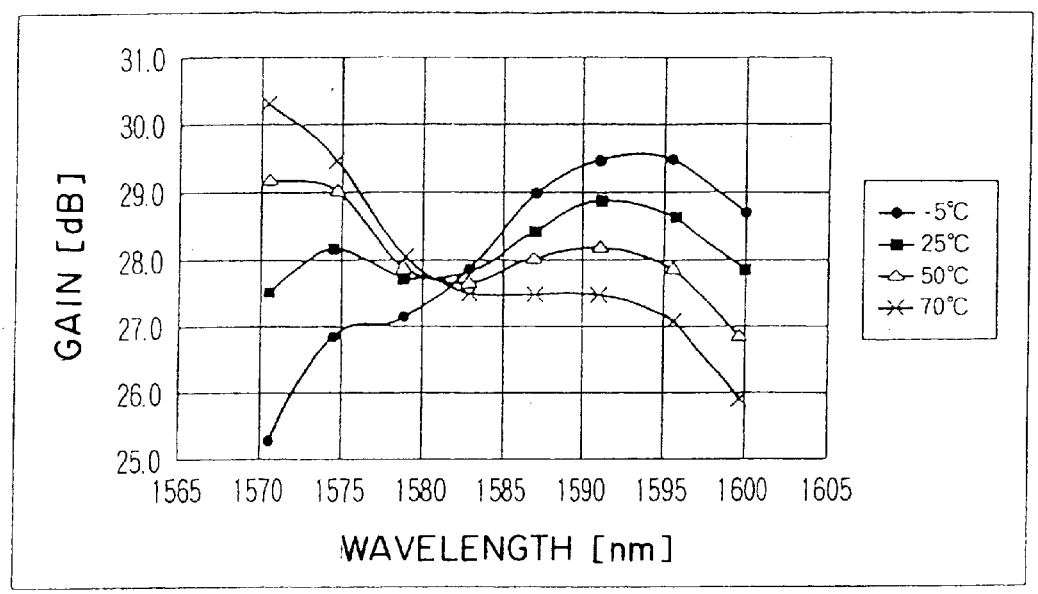
FIG. 5 is a graph showing a gain spectrum temperature property in an L band of the amplifier of FIG. 1, in a non-corrected condition.
Figure 6:
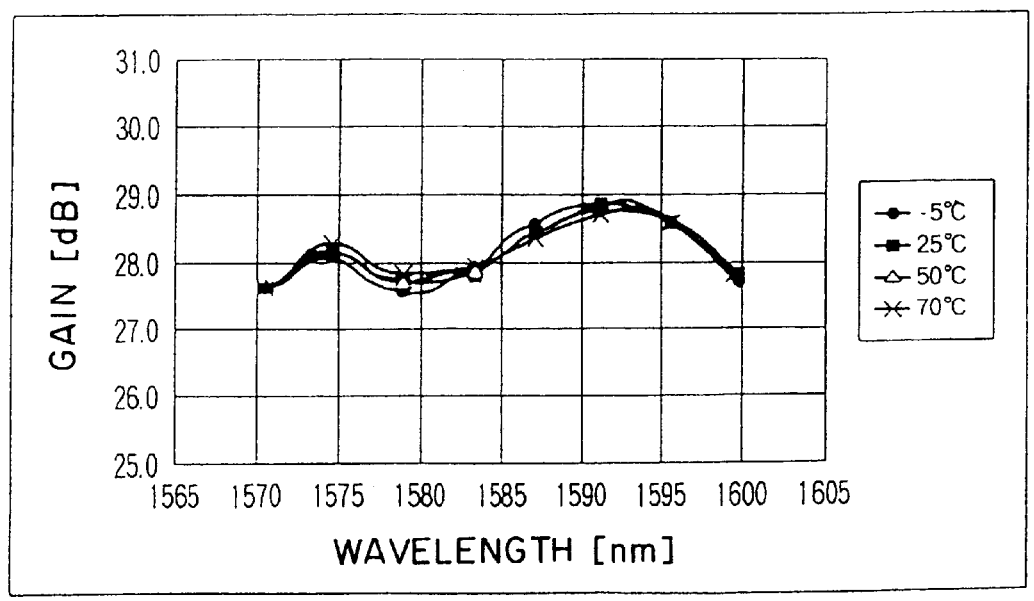
FIG. 6 is a graph showing the gain spectrum temperature property in the L band of the amplifier of FIG. 1, in a corrected condition.
Figure 7:
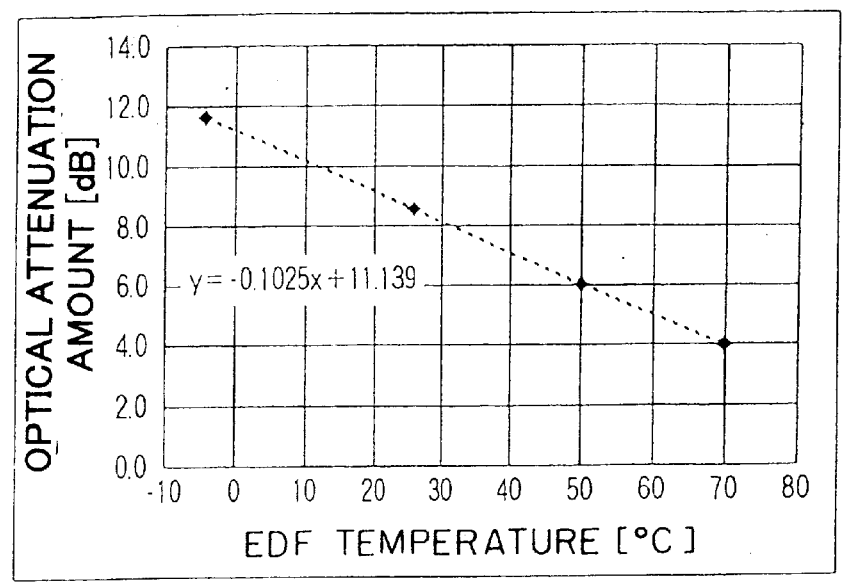
FIG. 7 is a graph showing an example of temperature correction effected by an optical variable attenuator to obtain the property of FIG. 6.

FIGS. 5 to 11 show the operation property of the said optical amplifier. Among them, FIGS. 5 to 7 show change and effect of the property regarding presence/absence of the temperature correction. In all of FIGS. 5 to 11, the input optical signal is obtained by multiplexing eight wavelength lights equidistantly distributed in the wavelength band of 1570 nm to 1600 nm and has intensity of −12.5 dBm/ch (−12.5 dBm per one wave; −3.5 dBm in total for eight waves) and output level of +15.5 dBm/ch (−12.5 dBm per one wave; +24.5 dBm in total for eight waves), and output of the entire EDFA is +24.5 dBm. Further, the change in temperature is applied to only the erbium doped silica fibers (EDF), and temperatures of other constructional parts are kept constant.

FIG. 5 shows the gain spectrum wavelength property of the optical amplifier (with no temperature correction), i.e., the property obtained when the optical attenuation amount ATT of the optical variable attenuator 9 is fixed to 8.5 dB and the temperature control is not effected. From FIG. 5, it can be seen that, when the EDF temperature is changed to −5° C., 25° C., 50° C. and 70° C., the gain wavelength property is greatly changed.

FIG. 6 shows the gain spectrum wavelength property (with temperature correction), i.e., the property obtained when the temperature correction is effected by changing the optical attenuation amount ATT of the optical variable attenuator 9 as shown in FIG. 7 by the calculation control circuit 12. From FIG. 6, it can be seen that, even when the EDF temperature is changed to −5° C., 25° C., 50° C. and 70° C., the wavelength dependency of the gain is not so changed greatly.

FIG. 7 shows a relationship between the EDF temperature and the optical variable attenuator correction amount, and inclination of the regression line sought by the method of least squares is −0.103. As a result, optical attenuation amount temperature coefficient (coefficient A) becomes −0.103 [dB/° C. ].

Figure 8:
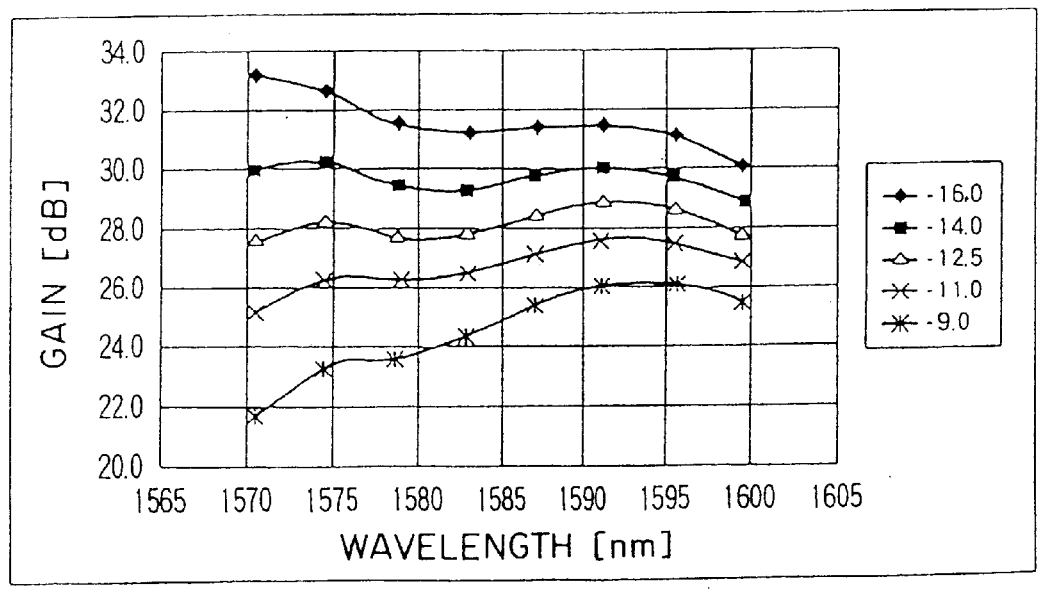
FIG. 8 is a graph showing a gain spectrum input optical signal intensity property in the L band of the amplifier of FIG. 1, in a condition that input optical signal intensity correction is not effected.
Figure 9:
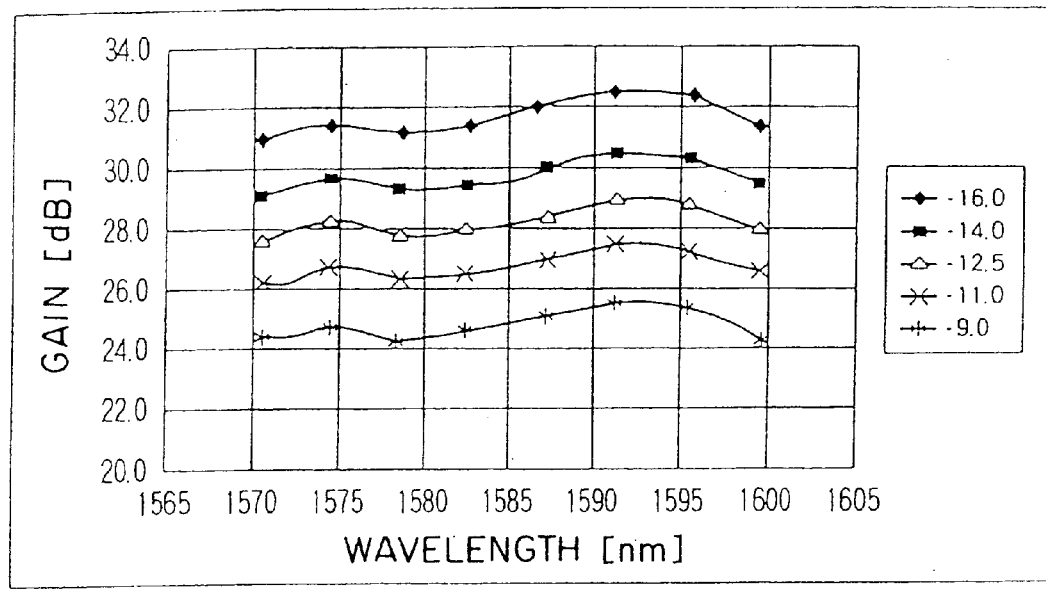
FIG. 9 is a graph showing the gain spectrum input optical signal intensity property in the L band of the amplifier of FIG. 1, in a condition that input optical signal intensity correction is effected.
Figure 10:
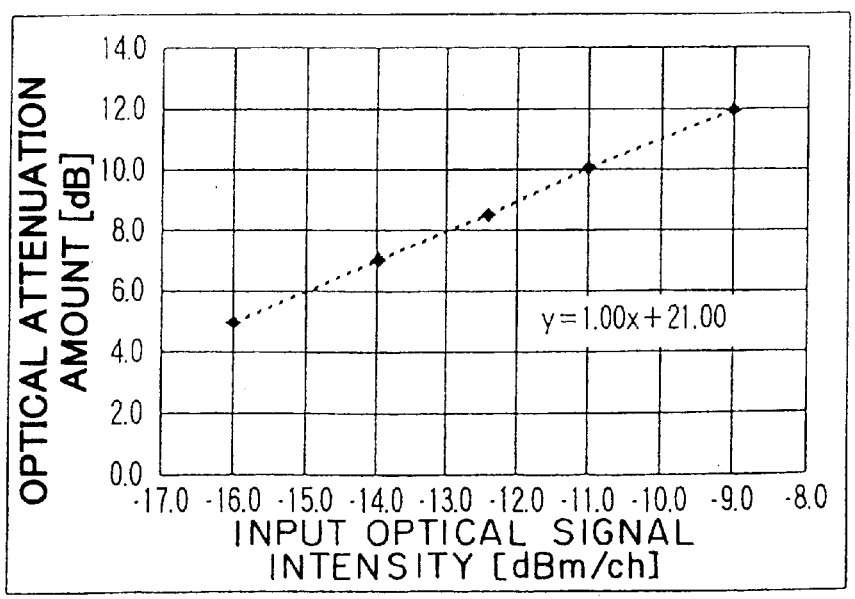
FIG. 10 is a graph showing an example of input optical signal intensity correction effected by an optical variable attenuator to obtain the property of FIG. 9.

FIGS. 8 to 10 show change and effect of the property regarding presence/absence of the input optical signal intensity correction. FIG. 8 shows the gain spectrum property (with no input optical signal intensity correction), i.e., the property obtained when the optical attenuation amount ATT of the optical variable attenuator 9 (FIG. 1) is fixed to 8.5 dB and the input optical signal intensity control is not effected. The EDF temperature is fixed to 25° C. From FIG. 8, it can be seen that, when the input level to the optical amplifier is changed to −9 dBm/ch, −11 dBm/ch, −12.5 dBm/ch, −14 dBm/ch and −16.5 dB/ch, the gain wavelength property is greatly changed accordingly.

FIG. 9 shows the gain spectrum property (with input optical signal intensity correction), i.e., the property obtained when the input optical signal intensity correction is effected by changing the optical attenuation amount ATT of the optical variable attenuator 9 as shown in FIG. 10 in accordance with the input optical signal intensity by the calculation control circuit 12. The EDF temperature is fixed to 25° C. From FIG. 9, it can be seen that, when the input optical signal intensity correction shown in FIG. 10 is effected, even if the input level is changed, the change in gain wavelength property can be reduced.

FIG. 10 shows a relationship between the input optical signal intensity and the correction amount of the optical variable attenuator 9, and inclination of the regression line sought by the method of least squares is 1.0. In this case, optical attenuation amount input optical signal intensity coefficient (coefficient B) becomes −1.00 [dB/dB]. The reason for inverting the sign is that a relationship "optical attenuation amount=coefficient B [dB/dB]×(output optical signal intensity−input optical signal intensity+insertion loss of optical part)[dB]+any coefficient (C)" becomes "optical attenuation amount=coefficient B [dB/dB]×(−input optical signal intensity) [dB]+any coefficient (C')" under a condition that the output optical signal intensity and the insertion loss of the optical part are constant.

Figure 11:
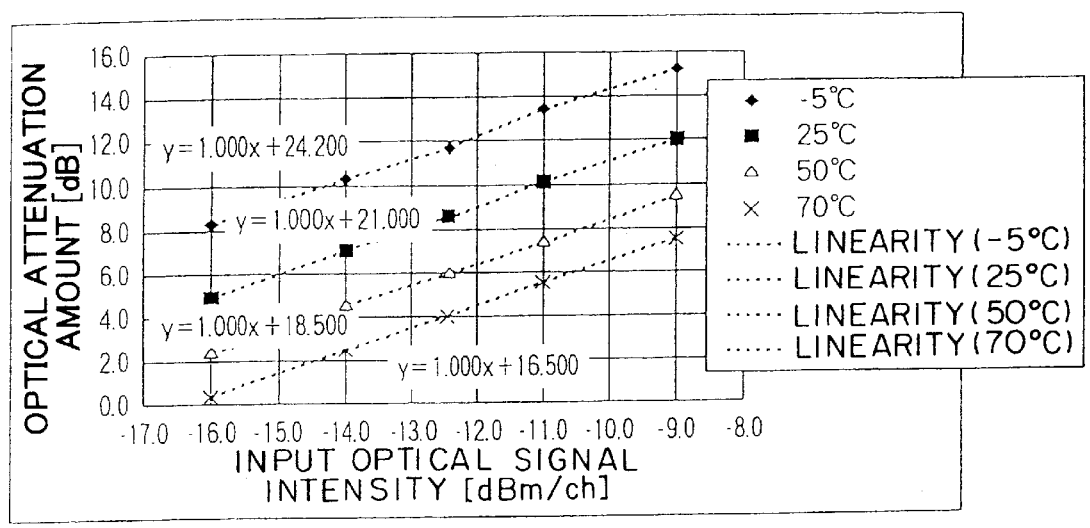
FIG. 11 is a graph showing an example that temperature correction and input optical signal intensity correction are both effected by an optical variable attenuator.

FIG. 11 shows the correction amount of the optical variable attenuator 9 corresponding to change in both temperature and input optical signal intensity. That is to say, an example of correction of the optical variable attenuator 9 effective when both the temperature and the input optical signal intensity are changed.

Figure 12:
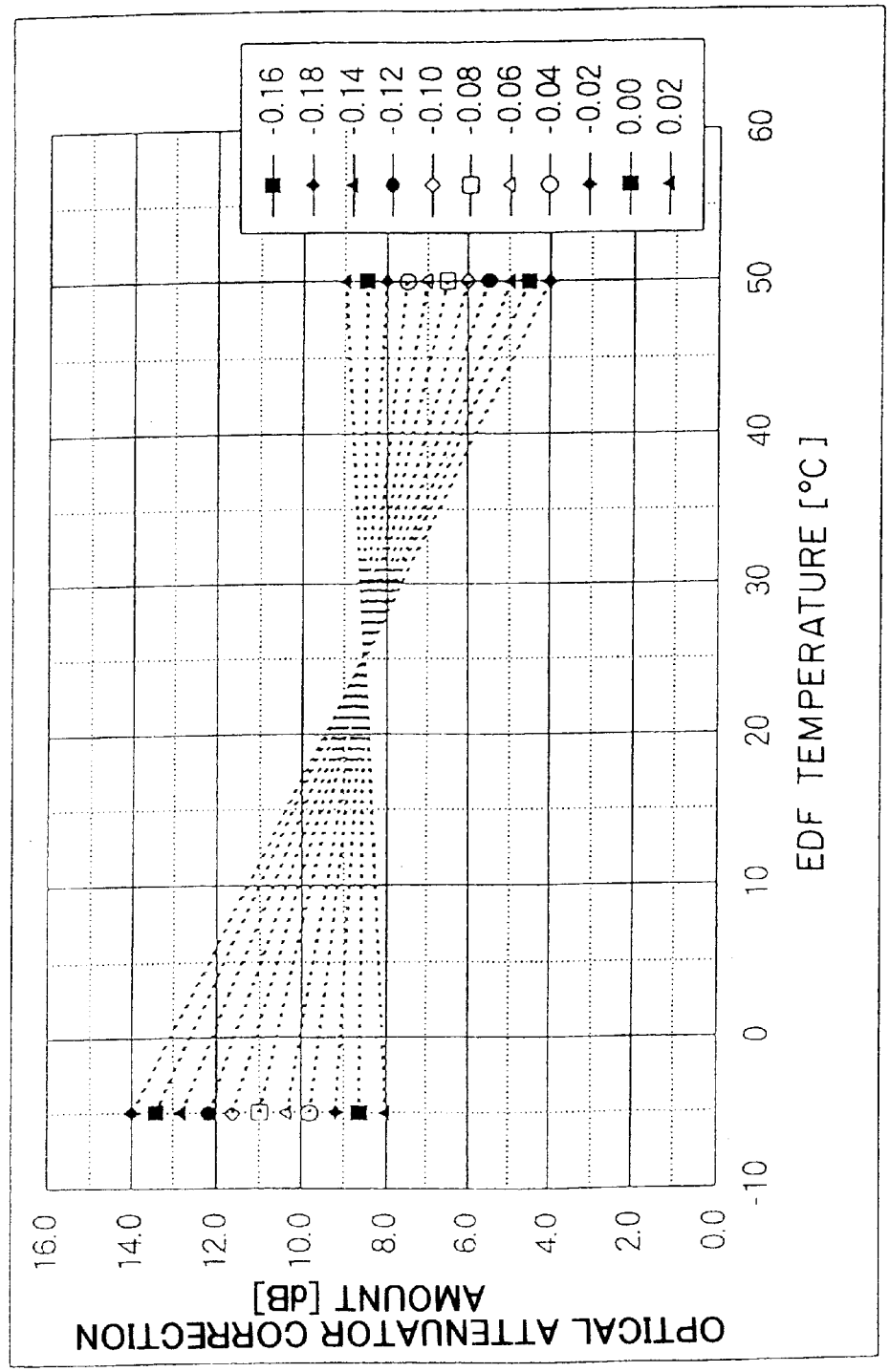
FIG. 12 is a graph showing a relationship between an optical variable attenuator setting value table and linear approximation coefficient A for temperature correction.

FIG. 12 shows several examples of setting value tables of the optical variable attenuator 9, i.e., setting value tables for effecting correction with respect to the change in temperature. Each of the setting value tables of the optical variable attenuator 9 is represented by the regression line based on the method of least squares; i.e., coefficient A in an equation "optical variable attenuator correction amount=coefficient A×temperature [° C. ]+any coefficient". The setting value table given by coefficient A=0.0 corresponds to the example shown in FIG. 5, and the setting value table given by coefficient A=−0.10 corresponds to the example shown in FIG. 6. Further, each setting value table of the optical variable attenuator 9 is set to be 8.5 dB at a temperature of 25° C.

Figure 13:
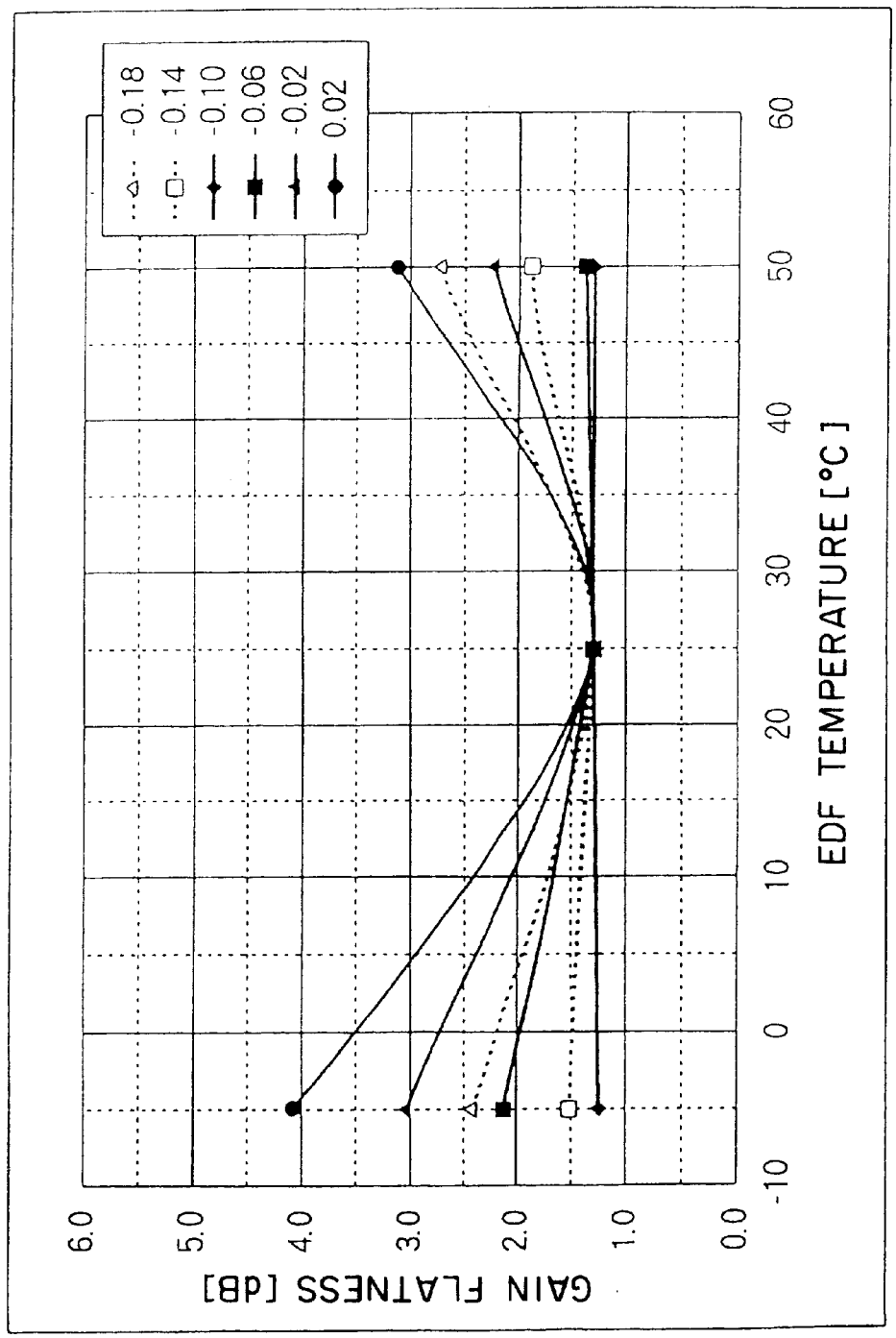
FIG. 13 is a graph a relationship between an optical variable attenuator setting value table and gain flatness for temperature correction.

FIG. 13 shows a relationship between temperature correction tables of the optical variable attenuator and gain flatness. More specifically, FIG. 13 shows change in gain flatness (=$G^{max}$−$G^{min}$) when the input optical signal intensity is constant (=−12.5 dBm/ch)(−12.5 dBm per one wave; −3.5 dBm in total for eight waves), the output optical signal intensity is constant (=+15.5 dBm/ch)(+15.5 dBm per one wave; +24.5 dBm in total for eight waves), and the EDF temperature is changed up to −5° C. to 50° C. in each optical variable attenuator setting table of FIG. 12. Where, $G^{max}$ is maximum gain among all of the channels, and $G^{min}$ is minimum gain among all of the channels.

Based on the gain flatness=1.3 dB at the EDF temperature of 25° C. (as a reference), when it is checked how much the gain flatness is increased within the temperature range from −5° C. to 50° C., in case of coefficient A=−0.10, the gain flatness becomes 0 dB, and, in case of coefficient A=+0.02, the gain flatness becomes 2.7 dB.

Figure 14:
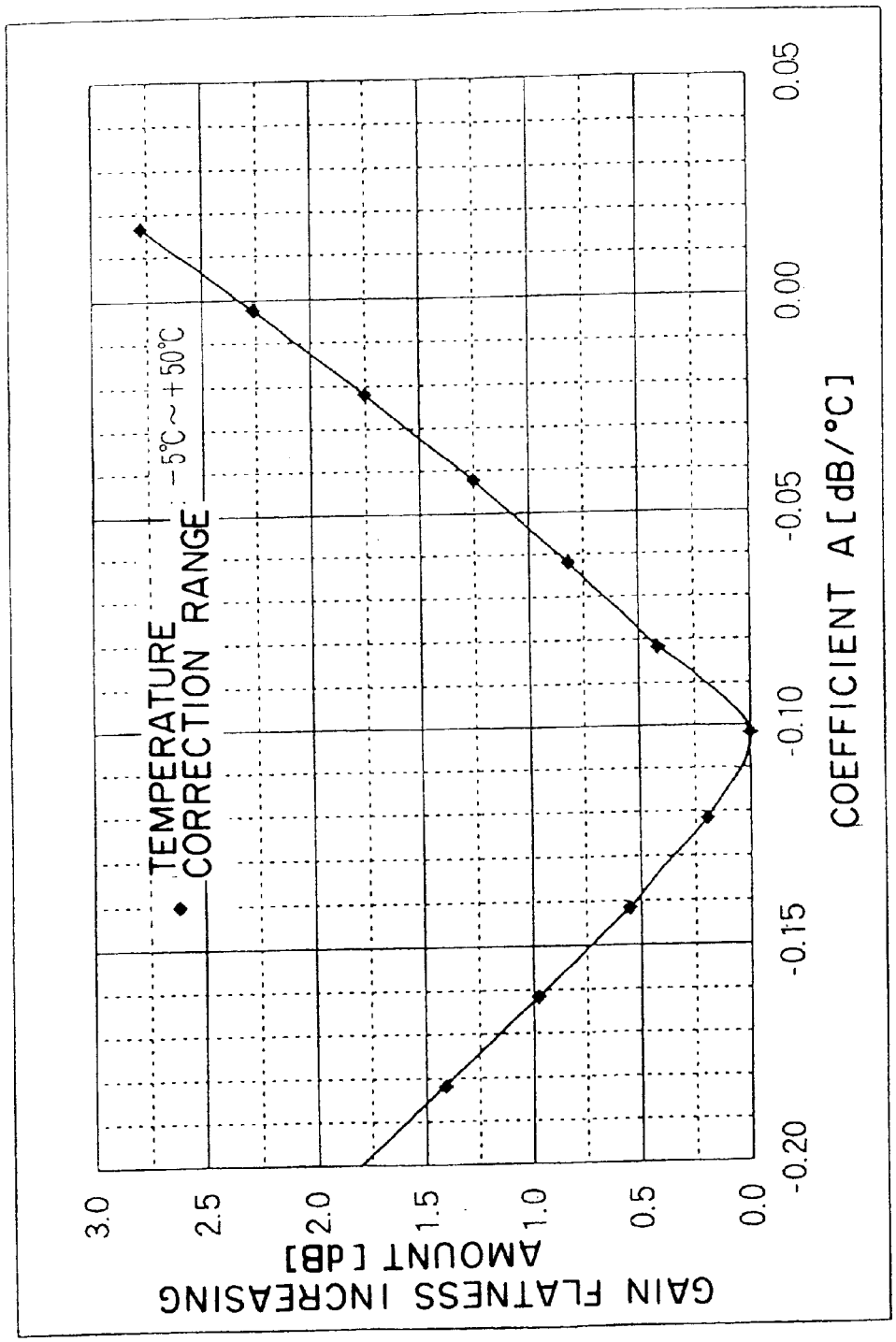
FIG. 14 is a graph a relationship between an optical variable attenuator setting value table and a gain flatness increasing amount for temperature correction.

FIG. 14 shows a relationship between temperature correction tables of the optical variable attenuator and gain flatness increasing amounts. More specifically, FIG. 14 shows how much the worst value of the gain flatness is increased when the input optical signal intensity is constant (=−12.5 dBm/ch) (−12.5 dBm per one wave; −3.5 dBm in total for eight waves), the output optical signal intensity is constant (=+15.5 dBm/ch)(+15.5 dBm per one wave; +24.5 dBm in total for eight waves), and the EDF temperature is changed up to −5° C. to 50° C. in each optical variable attenuator setting value table of FIG. 12. In this case, the gain flatness=1.3 dB at the EDF temperature of 25° C. is used as a reference. In case of coefficient A=−0.10, regardless of the change in EDF temperature, the increasing amount for maintaining the gain flatness to 1.3 dB becomes 0 dB. The values shown in FIG. 14 are equal to gain flatness guaranteed minimum values within the EDF temperature range from −5° C. to +50° C. when the gain flatness is 0 dB. In FIG. 14, plots indicate actual measured values, and a curve is an approximation curve. It can be seen that, as the linear approximation coefficient A is changed, the gain flatness is worsened (increased). When it is assumed that an upper limit of the gain flatness increasing amount is 1 dB, an allowable range for the coefficient A becomes −0.16 to −0.04 [dB/° C.].

Figure 15:
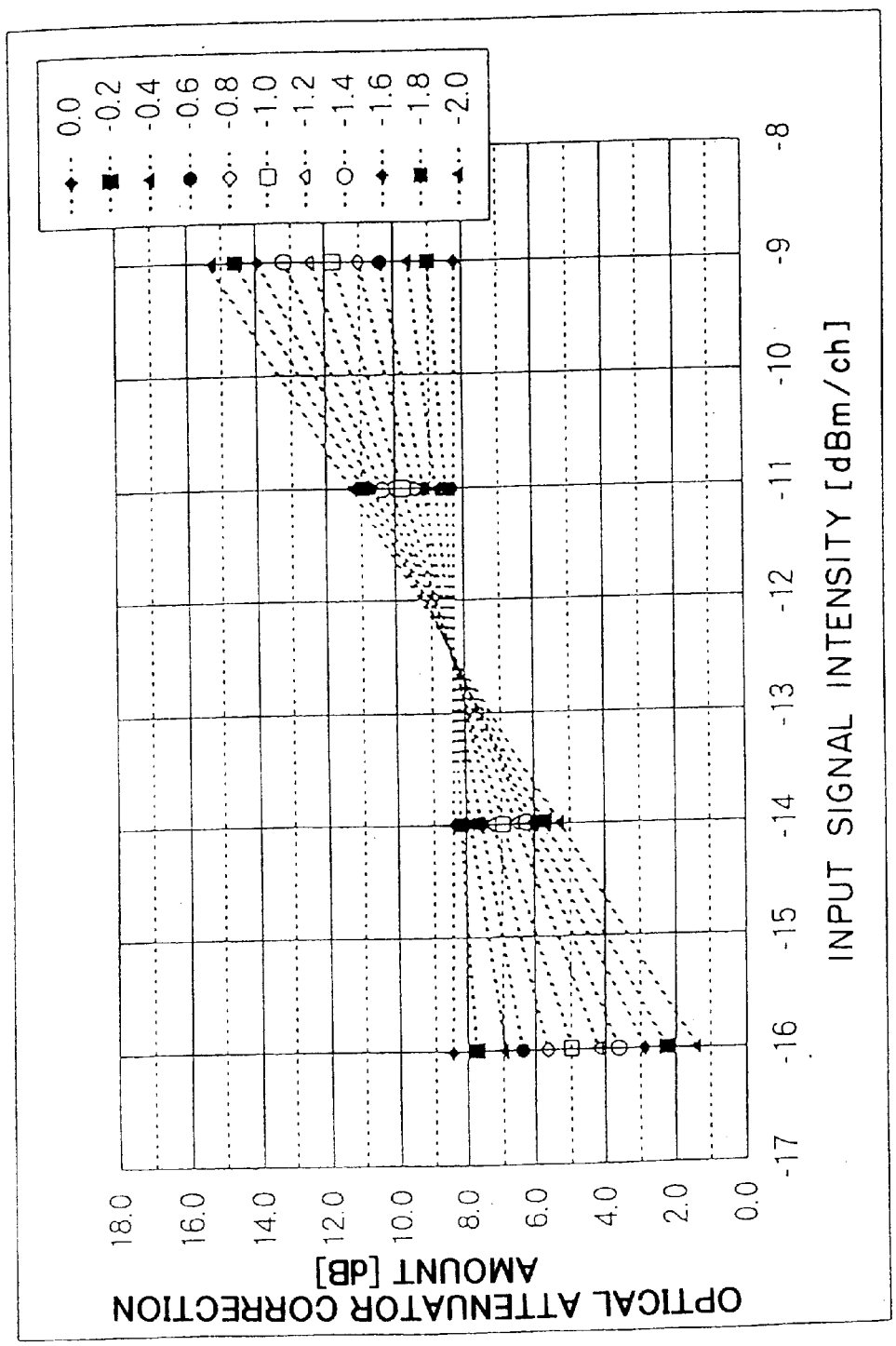
FIG. 15 is a graph showing a relationship between an optical variable attenuator setting value table and linear approximation coefficient B for input optical signal intensity correction.

FIG. 15 shows a different example of optical variable attenuator setting value tables for effecting correction with respect to the change in input optical signal intensity. Each of the setting value tables of the optical variable attenuator 9 is represented (by applying the regression line based on the method of least squares to the table) by coefficient B in the regression line equation "optical variable attenuator correction amount (optical attenuation amount)=coefficient B [dB/dB]×(output optical signal intensity−input optical signal intensity+insertion loss of optical part)+any coefficient". The setting value table given by coefficient B=0.0 corresponds to the example shown in FIG. 8, and the setting value table given by coefficient B=−1.0 corresponds to the example shown in FIG. 9. Incidentally, each of the setting value tables of the optical variable attenuator is set so that it becomes 8.5 dB when the input optical signal intensity is −12.5 dBm/ch (−12.5 dBm per one wave; −3.5 dBm in total for eight waves), the output optical signal intensity is +15.5 dBm/ch (−12.5 dBm per one wave; +24.5 dBm in total) and the insertion loss amount of the optical part is 3 dB.

Figure 16:
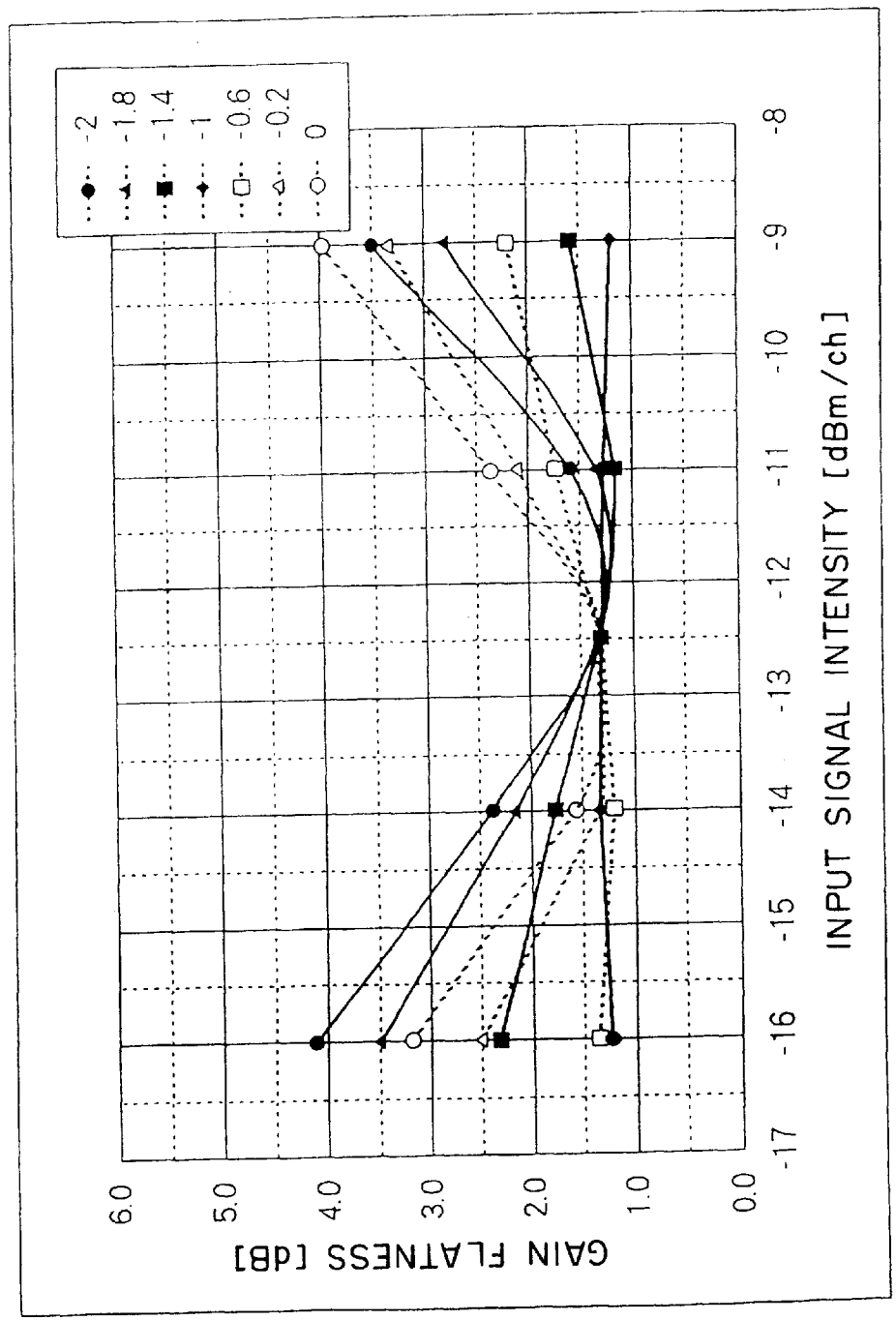
FIG. 16 is a graph showing a relationship between an optical variable attenuator setting value table and gain flatness for input optical signal intensity correction.

FIG. 16 shows a relationship between the setting value tables of the optical variable attenuator and the gain flatness for temperature correction. More specifically, FIG. 16 shows how much the gain flatness (=$G^{max}$−$G^{min}$) is changed when the EDF temperature is constant (=25 of ° C.), the output optical signal intensity is constant (=+15.5 dBm/ch)(−12.5 dBm per one wave; +24.5 dBm in total), and the input optical signal intensity is changed from −16 dBm/ch to −9 dBm/ch (from −16 dBm to −9 dBm/ch per one wave; from −7 dBm to +0 dBm in total for eight waves) in each setting value tables of the optical variable attenuator of FIG. 15. Based on the gain flatness=1.3 dB at the EDF temperature of 25° C. (as a reference), when it is checked how much the gain flatness is increased within the input optical signal intensity range from −16 dBm/ch to −9dBm/ch, in case of coefficient B=−1.0, the gain flatness becomes 0 dB, and, in case of coefficient B=−2.0, the gain flatness becomes 2.8 dB.

Figure 17:
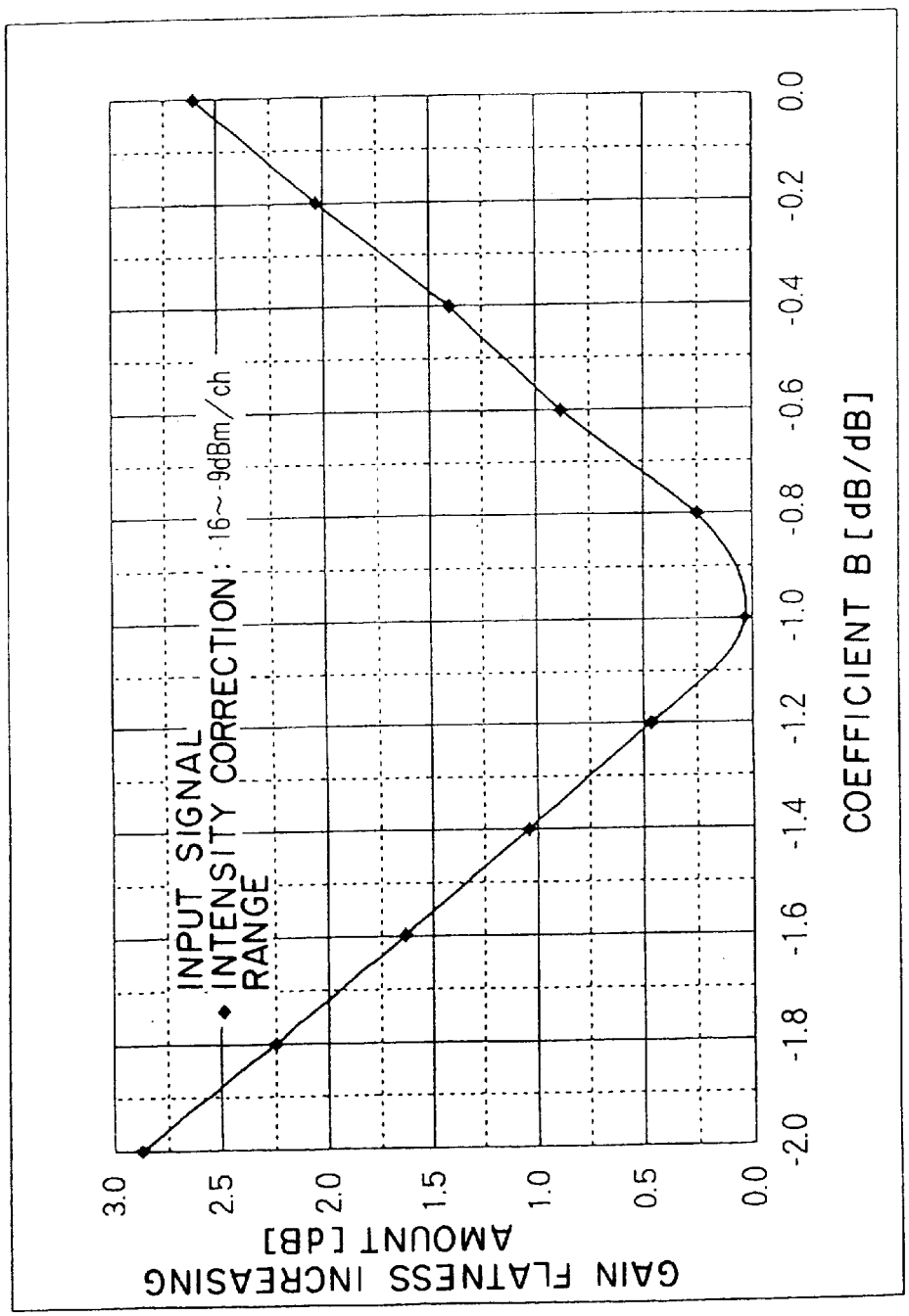
FIG. 17 is a graph showing a relationship between an optical variable attenuator setting value table and a gain flatness increasing amount for input optical signal intensity correction.

FIG. 17 shows a relationship between the input optical signal intensity correction optical variable attenuator and the linear approximation coefficient B. More specifically, FIG. 17 shows how much the worst value of the gain flatness (=$G^{max}$−$G^{min}$) is increased when the EDF temperature is constant (=25° C.), the output optical signal intensity is constant (=+15.5 dBm/ch)(−12.5 dBm per one wave; +24.5 dBm in total), and the input optical signal intensity is changed from −16 dBm/ch to −9 dBm/ch (from −16 dBm to −9 dBm/ch per one wave; from −7 dBm to +0 dBm in total for eight waves) in each setting value table of the optical variable attenuators of FIG. 15. In this case, the gain flatness =1.3 dB at the input optical signal intensity of −12.5 dBm/ch is used as a reference. In case of coefficient B=−1.0, regardless of the input optical signal intensity, the increasing amount for maintaining the gain flatness to 1.3 dB becomes 0 dB. The values shown in FIG. 17 are equal to gain flatness guaranteed minimum values within the input optical signal intensity range from −16 dBm/ch to −9 dBm/ch when the gain flatness is 0 dB. In FIG. 17, plots indicate actual measured values, and a curve is an approximation curve. It can be seen that, as the linear approximation coefficient B is changed, the gain flatness is worsened (increased). When it is assumed that an upper limit of the gain flatness increasing amount is 0.25 dB, an allowable range for the coefficient B becomes −1.1 to −0.8 [dB/dB].

Figure 18:
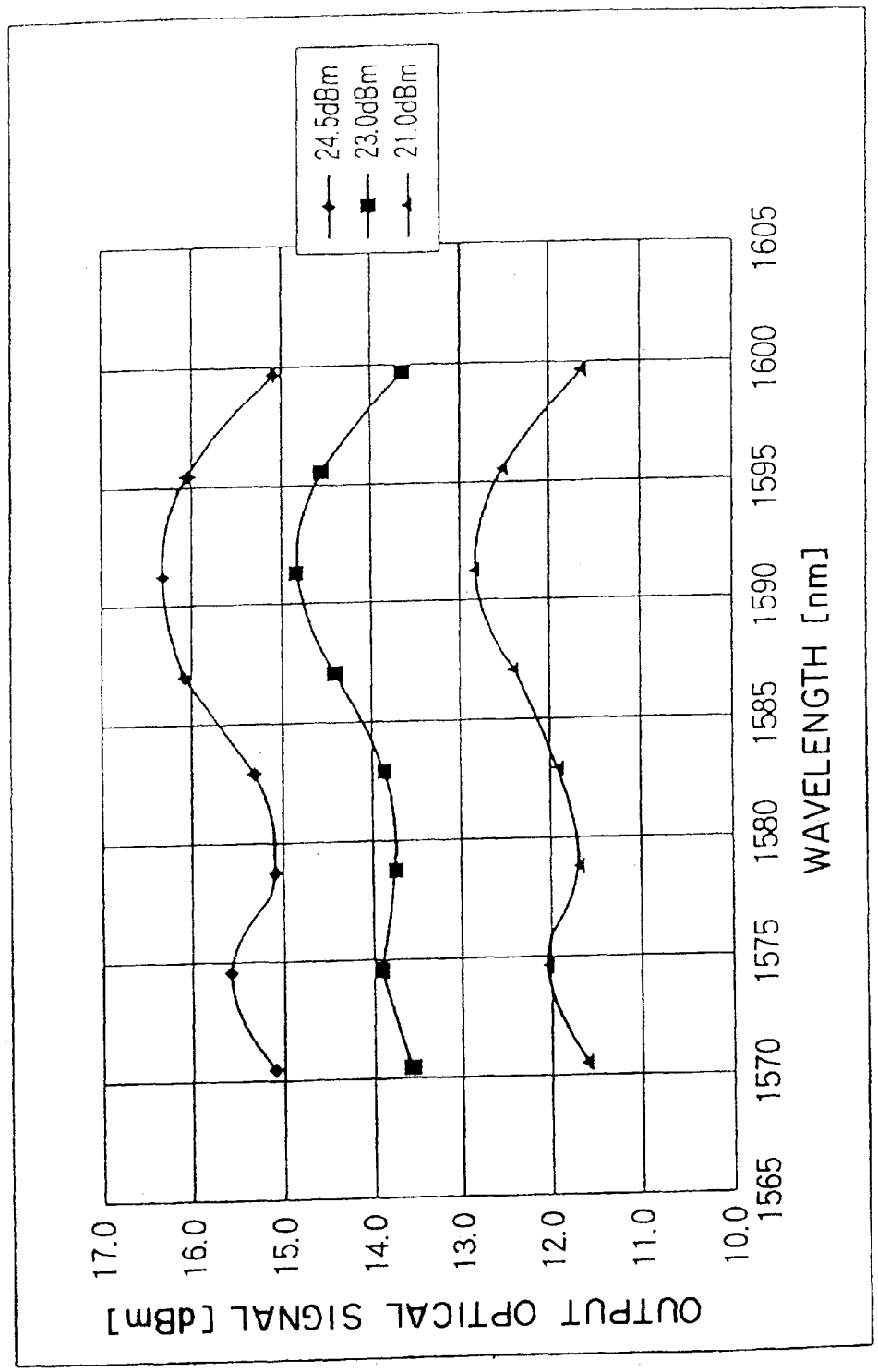
FIG. 18 is a graph showing an output wavelength property at a temperature of −25° C.
Figure 20:
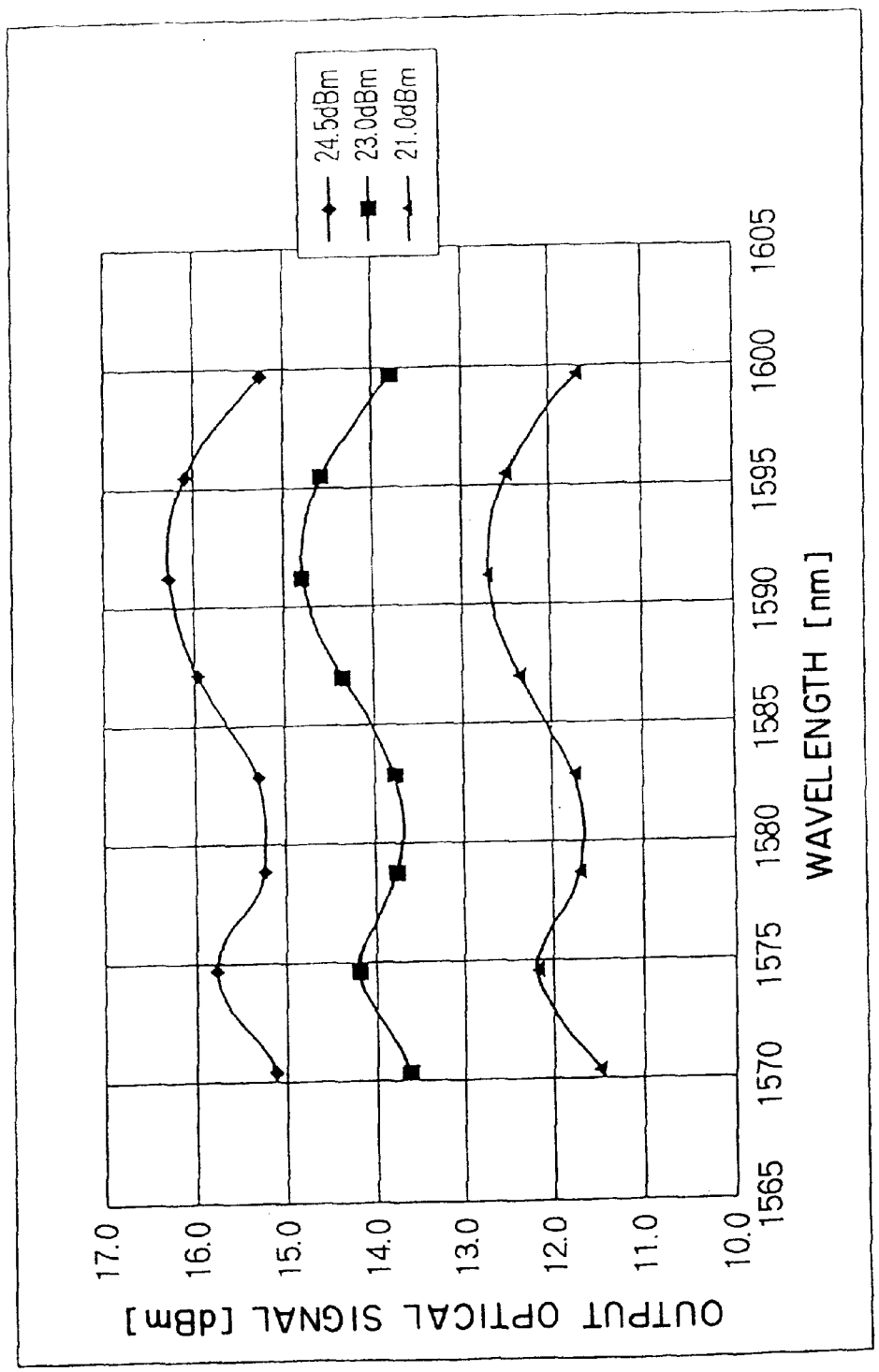
FIG. 20 is a graph showing an output wavelength property at a temperature of 50° C.
Figure 21:
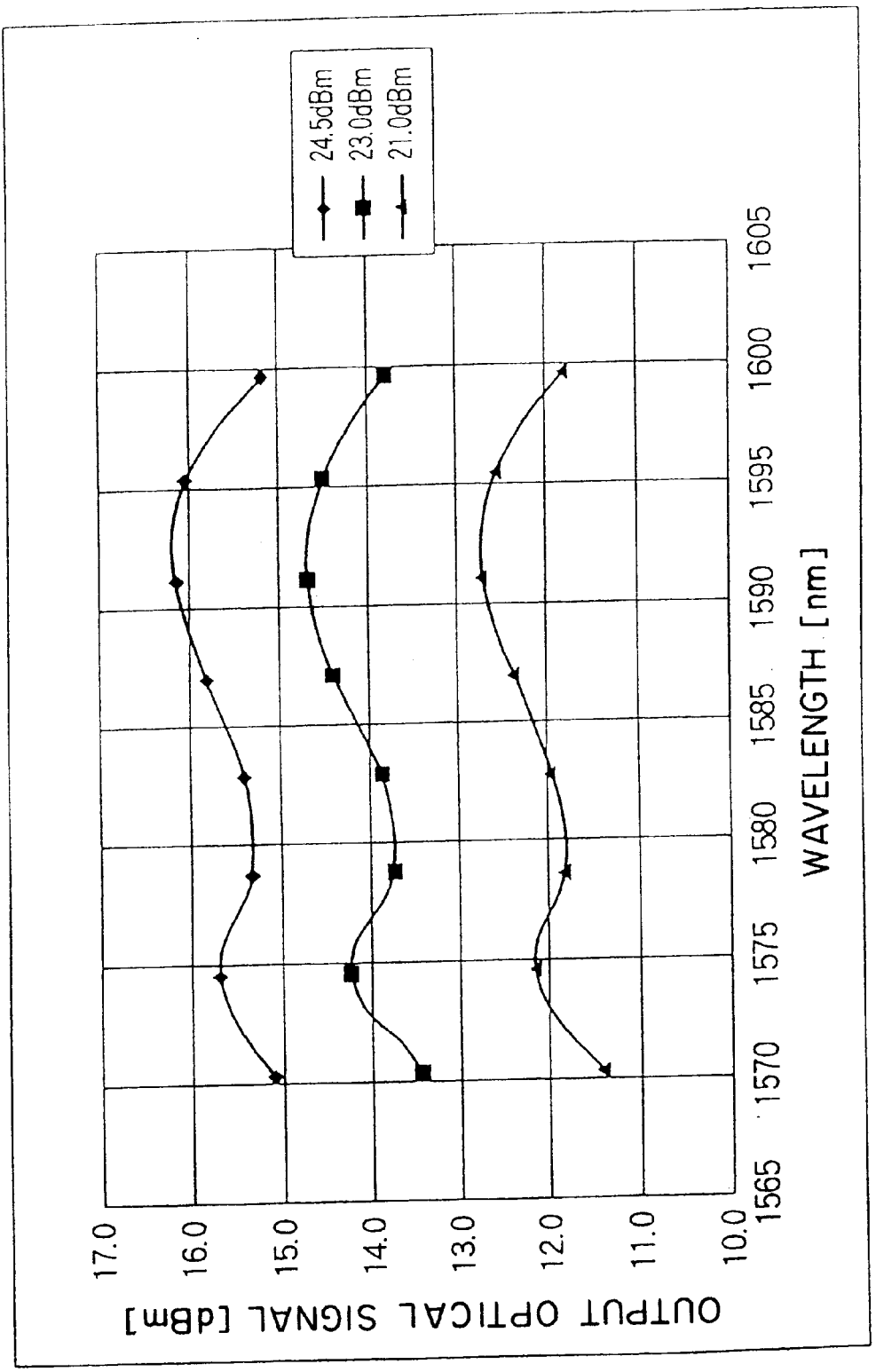
FIG. 21 is a graph showing an output wavelength property at a temperature of 70° C.
Figure 22:
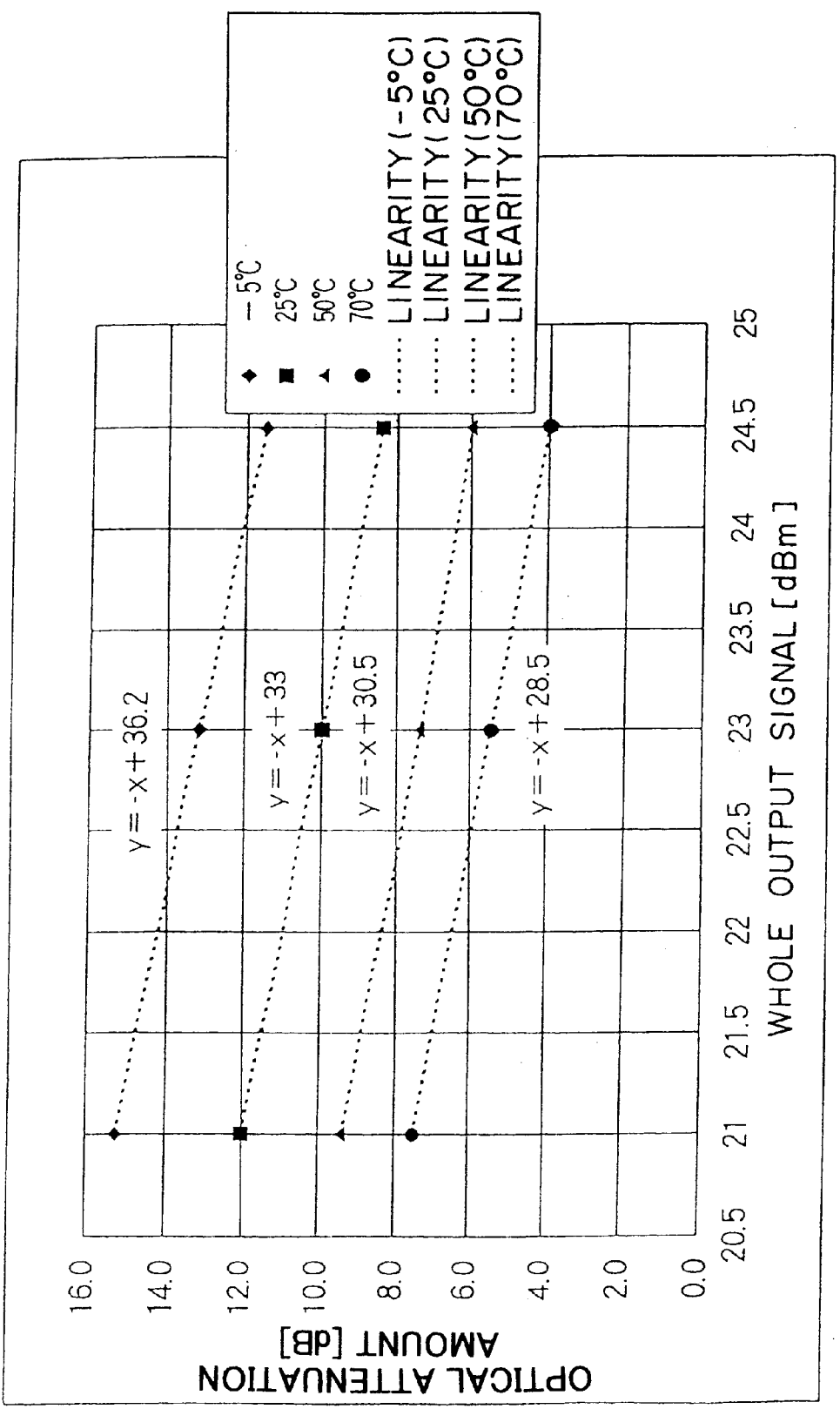
FIG. 22 is a graph showing an example of correction effected by an optical variable attenuator to obtain the output wavelength property of FIG. 21 from FIG. 18.

FIGS. 18 to 21 show an output wavelength property when the optical variable attenuator is controlled as shown in FIG. 22 by the calculation control circuit 12. FIG. 18 shows a wavelength property of the output optical signal when the EDF temperature is fixed to −5° C., the input level is fixed to −12.5 dBm/ch and the output level (in total for eight waves) is changed to +24.5 dBm, +23.0 dBm and +21.0 dBm. It can be seen that similar wavelength property is maintained at the output levels of +24.5 dBm, +23.0 dBm and +21.0 dBm.

Figure 19:
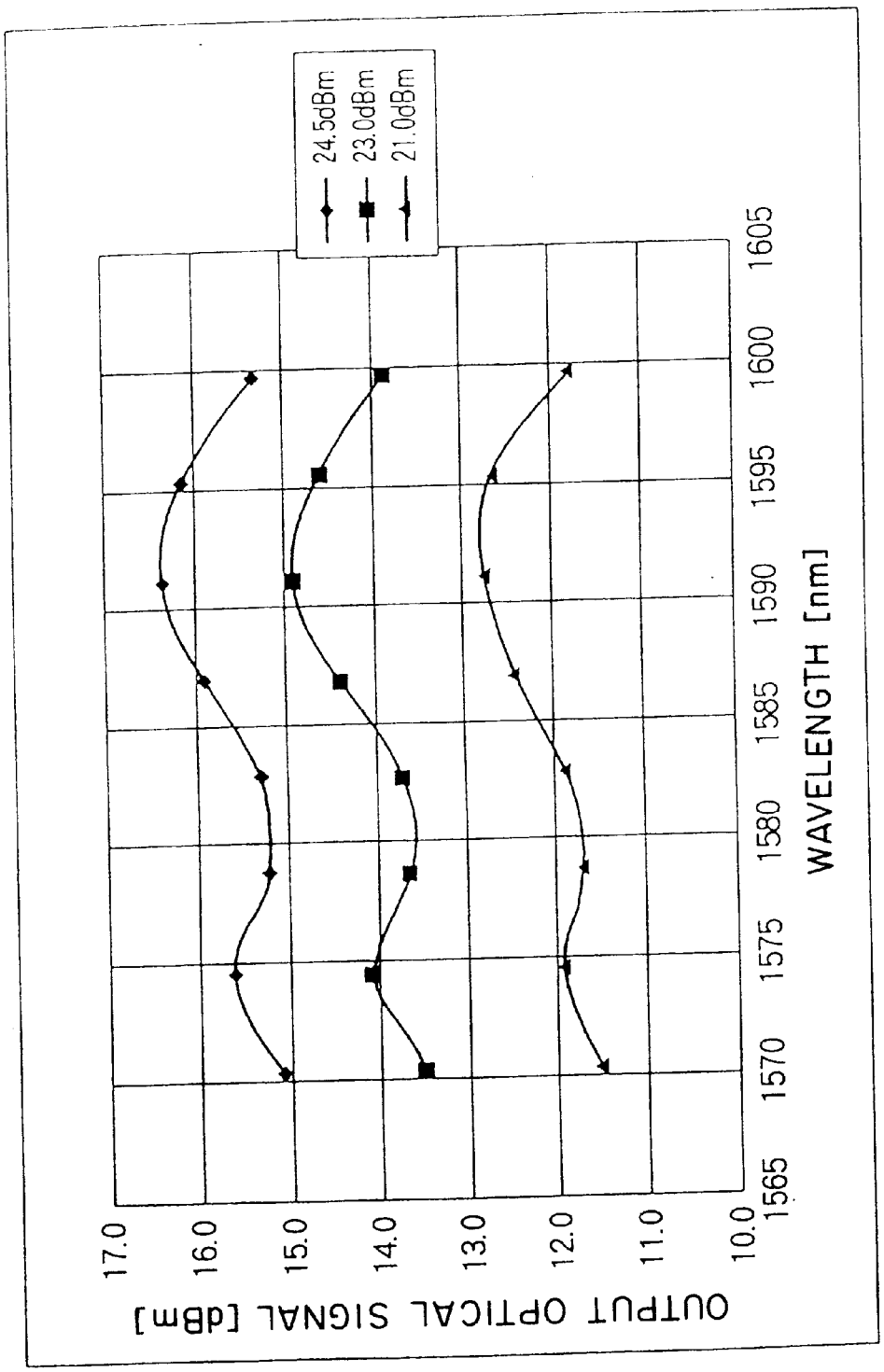
FIG. 19 is a graph showing an output wavelength property at a temperature of 25° C.

FIG. 19 shows a wavelength property of the output optical signal when the EDF temperature is fixed to 25° C., the input level is fixed to −12.5 dBm/ch and the output level (in total for eight waves) is changed to +24.5 dBm, +23.0 dBm and +21.0 dBm. It can be seen that similar wavelength property is maintained at the output levels of +24.5 dBm, +23.0 dBm and +21.0 dBm.

FIG. 20 shows a wavelength property of the output optical signal when the EDF temperature is fixed to 50° C., the input level is fixed to −12.5 dBm/ch and the output level (in total for eight waves) is changed to +24.5 dBm,+23.0 dBm and +21.0 dBm. It can be seen that similar wavelength property is maintained at the output levels of +24.5 dBm, +23.0 dBm and +21.0 dBm.

FIG. 21 shows a wavelength property of the output optical signal when the EDF temperature is fixed to 70° C., the input level is fixed to −12.5 dBm/ch and the output level (in total for eight waves) is changed to +24.5 dBm, +23.0 dBm and +21.0 dBm. It can be seen that similar wavelength property is maintained at the output levels of +24.5 dBm, +23.0 dBm and +21.0 dBm.

FIG. 22 shows the setting tables on the basis of which the optical variable attenuator is controlled by the calculation control circuit 12. The setting tables serve to compensate both the change in temperature and the change in output optical signal intensity. When the regression lines of the setting tables are sought by the method of least squares, inclination of each regression line y becomes −1.0 and the coefficient B becomes −1.0.

Second Embodiment

Figure 2:
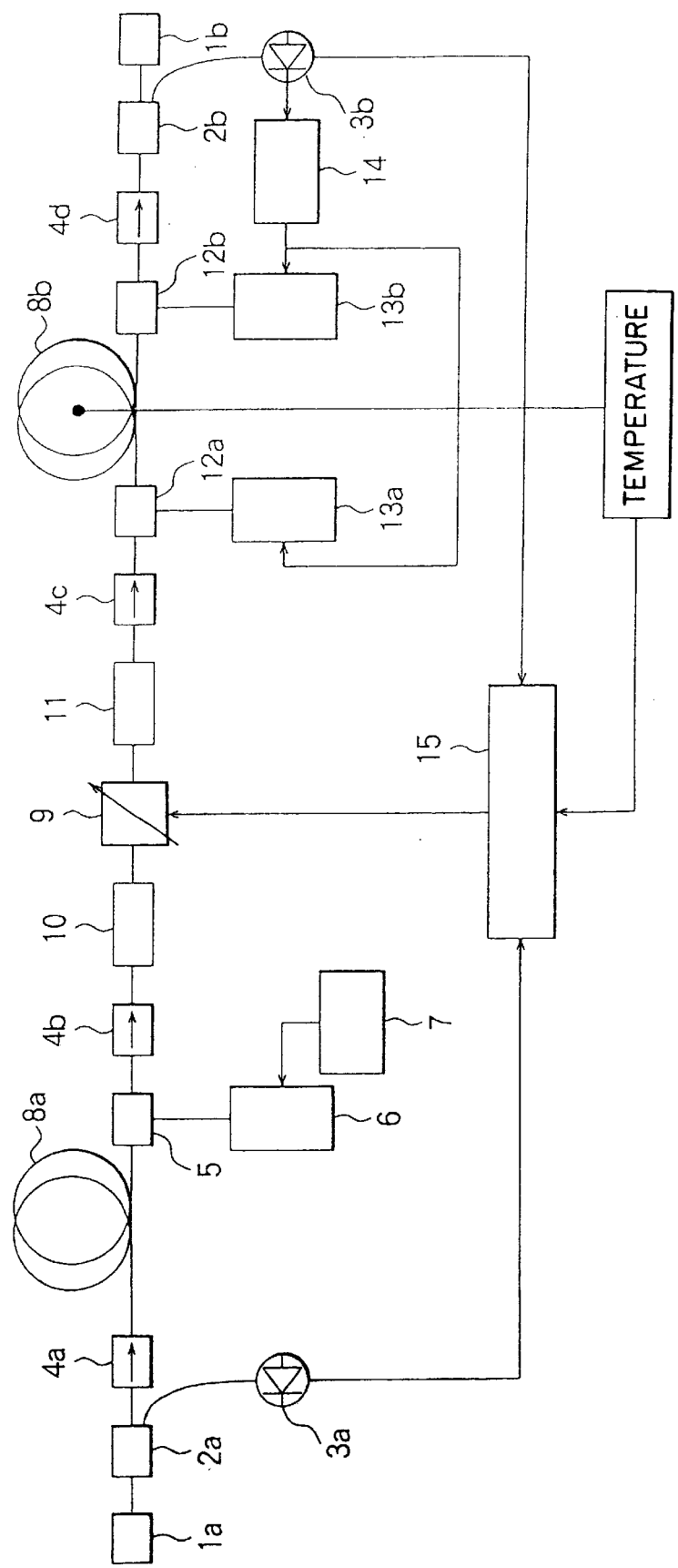
FIG. 2 is a circuit diagram showing an optical amplifier according to a second embodiment of the present invention.

FIG. 2 shows an optical amplifier according to a second embodiment of the present invention. The optical amplifier is of two-stage type and comprises an input optical connector 1a, an output optical connector 1b, optical couplers or beam splitters 2a, 2b, optical signal monitors PD 3a, 3b, optical isolators 4a, 4b, 4c, 4d, pumping light/optical signal wavelength-division multiplexers 5, 12a, 12b, pumping light sources 6, 13a, 13b, a pumping light output constant control circuits (APC) 7, rare earth doped optical fibers 8a, 8b, an optical variable attenuator 9, an optical part (optical filter part) 10, an optical part (replaceable optical part) 11, an optical signal output constant control circuit (ALC) 14, and a calculation control circuit 15.

In FIG. 2, a part of optical signal outputted from the input optical connector 1a is picked up by the optical coupler or beam splitter 2a and light intensity thereof is measured by the optical signal monitor 3a. On the other hand, the optical signal passed through the optical coupler or beam splitter 2a passes through the optical isolator 4a and is incident on the rare earth doped optical fiber 8a which is now maintained in a pumping condition by pumping light generated by the pumping light source 6 (output of which is kept constant by the pumping light output constant control circuit (APC) 7) and combined by the pumping light/optical signal wavelength-division multiplexer 5. In this optical fiber, the optical signal is subjected to optical amplification by stimulated emission. The optical-amplified optical signal is incident on the optical isolator 4b. The optical signal passed through the optical isolator 4b and the optical filter part 10 is attenuated by the optical variable attenuator 9 an optical attenuation amount of which is variably controlled and is incident on the replaceable optical part 11. The optical signal passed through the replaceable optical part 11 is directed, through the optical isolator 4c, to the subsequent second stage optical amplifying portion, where the optical signal is amplified. That is to say, the optical signal passed through the optical isolator 4c and the pumping light/optical signal wavelength-division multiplexer 12a is incident on the rare earth doped optical fiber 8b which is now maintained in a pumping condition by pumping light generated by the pumping light source 13a (which is controlled to keep the optical signal output of the entire optical fiber amplifiers constant by ALC 14) and combined by the pumping light/ optical signal wavelength-division multiplexer 12a and by pumping light generated by the pumping light source 13b (which is also controlled to keep the optical signal output of the entire optical fiber amplifiers constant) and combined by the pumping light/optical signal wavelength-division multiplexer 12b. In this optical fiber, the optical signal is subjected to optical amplification by stimulated emission. The optical-amplified is incident on the optical isolator 4d. A part of the optical signal passed through the optical isolator 4d is picked up by the optical coupler or beam splitter 2b and light intensity thereof is measured by the optical signal monitor 3b. The output optical connector 1b emits the amplified optical signal. The light intensities measured in the optical signal monitors 3a, 3b are converted into control signals and are inputted to the calculation control circuit 15, together with a signal from a temperature sensor (not shown).

Figure 23:
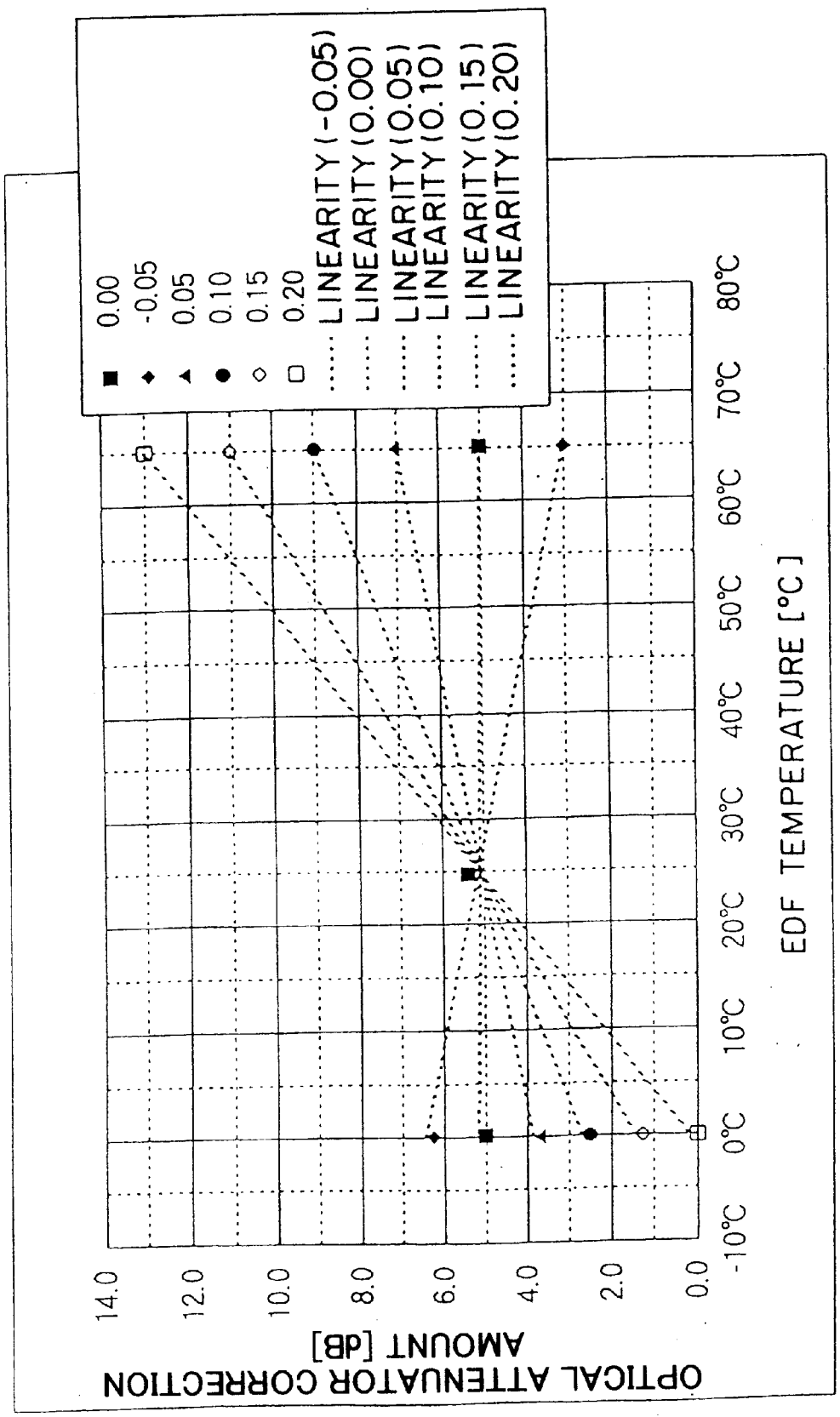
FIG. 23 is a graph showing a relationship between an optical variable attenuator setting value table and linear approximation coefficient A for temperature correction, in a C band.
Figure 28:
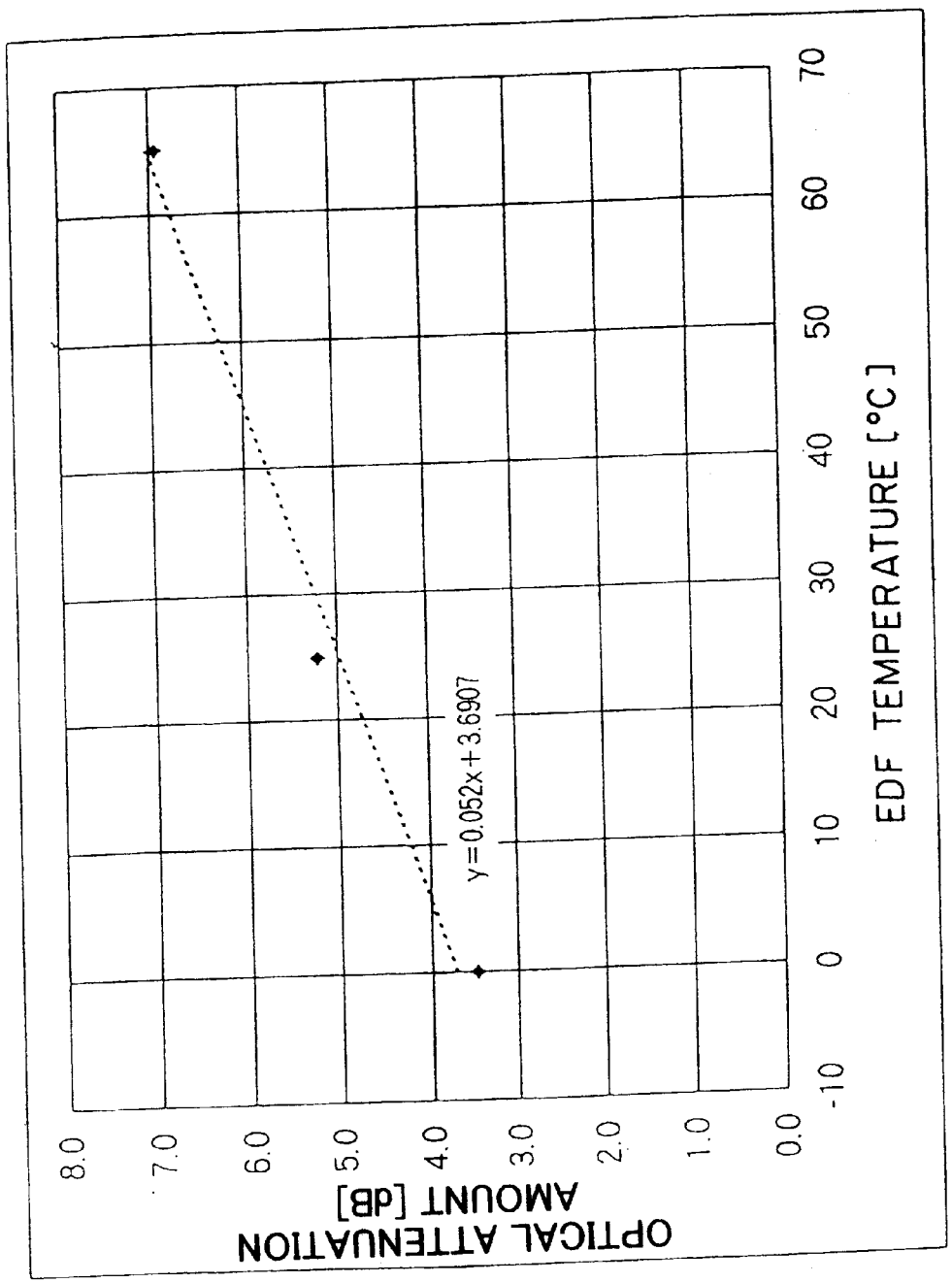
FIG. 28 is a graph showing an example of temperature correction effected by an optical variable attenuator to obtain the property of FIG. 27.

The calculation control circuit 15 shown in FIG. 2 includes optical attenuation amount tables as shown in FIGS. 23 and 28 and is adapted to receive the signals from the temperature sensor (not shown) and the optical signal monitors PD 3a, 3b to change the optical attenuation amount of the optical variable attenuator 9 on the basis of the temperature and the optical signal level.

FIG. 23 shows several examples of setting value tables of the optical variable attenuator 9 of the optical amplifier of FIG. 2 (having gain band of 1545 nm to 1560 nm), i.e., setting value tables for effecting correction with respect to the change in temperature. Each of the setting value tables of the optical variable attenuator 9 is represented by the regression line based on the method of least squares; i.e., coefficient A in an equation "optical variable attenuator correction amount=coefficient A×temperature [° C. ]+any coefficient". The setting value table given by coefficient A=0.0 corresponds to the setting value table shown in FIG. 26, and the setting value table given by coefficient A=+0.05 corresponds to the setting value table shown in FIG. 27. Further, each setting value table of the optical variable attenuator 9 is set to be 5.4 dB at a temperature of 25° C.

Figure 24:
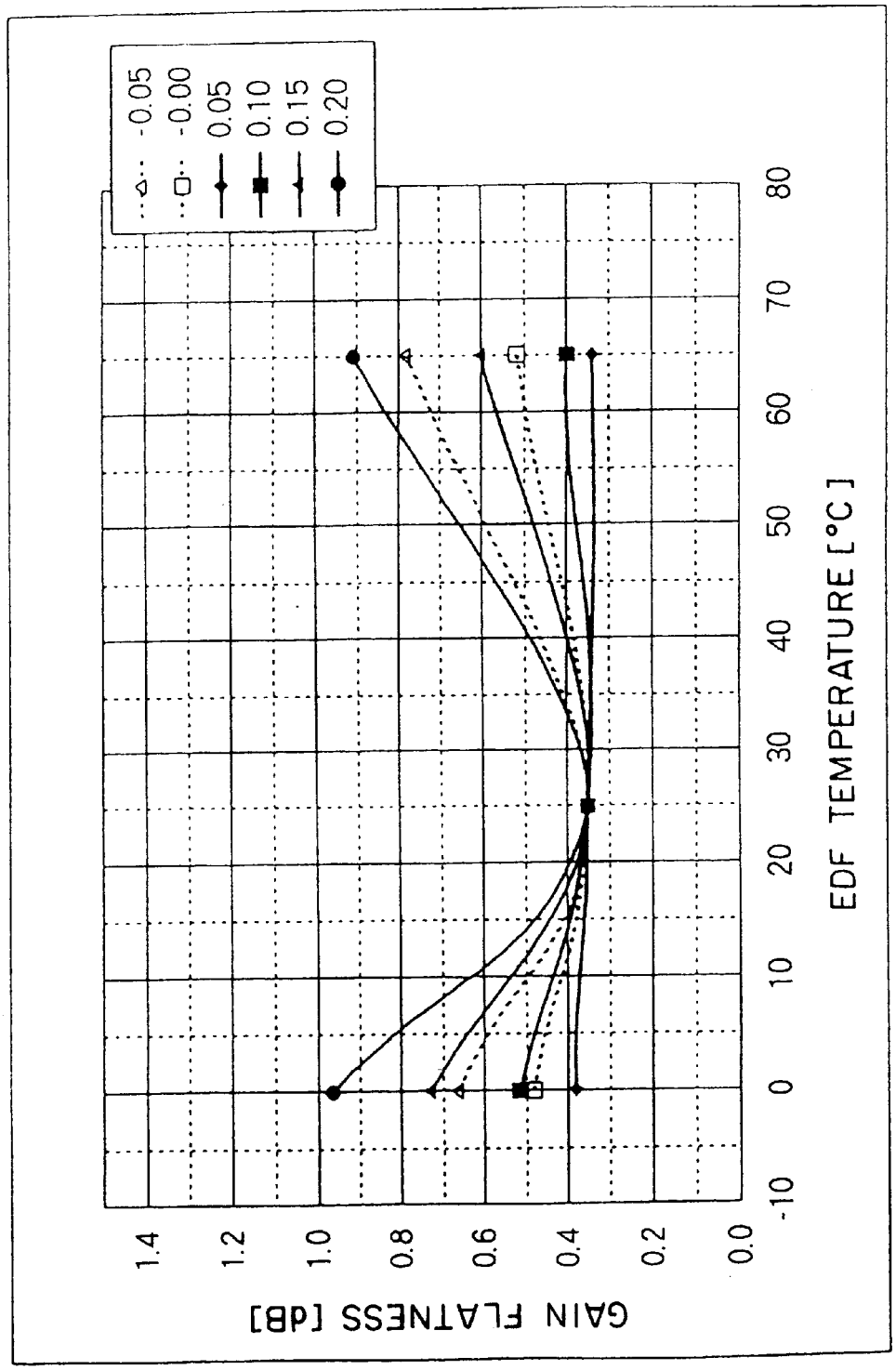
FIG. 24 is a graph showing a relationship between an optical variable attenuator setting value table and gain flatness for temperature correction, in the C band.

FIG. 24 shows a relationship between temperature correction tables of the optical variable attenuator and gain flatness. More specifically, FIG. 24 shows change in gain flatness (=$G^{max}-G^{min}$) when the input optical signal intensity is constant (=−24 dBm/ch)(−24 dBm per one wave; −15 dBm in total for eight waves), the output optical signal intensity is constant (=+0.0 dBm/ch)(+0.0 dBm per one wave; +9.0 dBm in total for eight waves), and the EDF temperature is changed up to −0° C. to 65° C. in each optical variable attenuator setting value table of FIG. 23. Based on the gain flatness=0.4 dB at the EDF temperature of 25° C. (as a reference), when it is checked how much the gain flatness is increased within the temperature range from −0° C. to 65° C., in case of coefficient A=+0.05, the gain flatness becomes 0 dB, and, in case of coefficient A=+0.20, the gain flatness becomes 0.6 dB.

Figure 25:
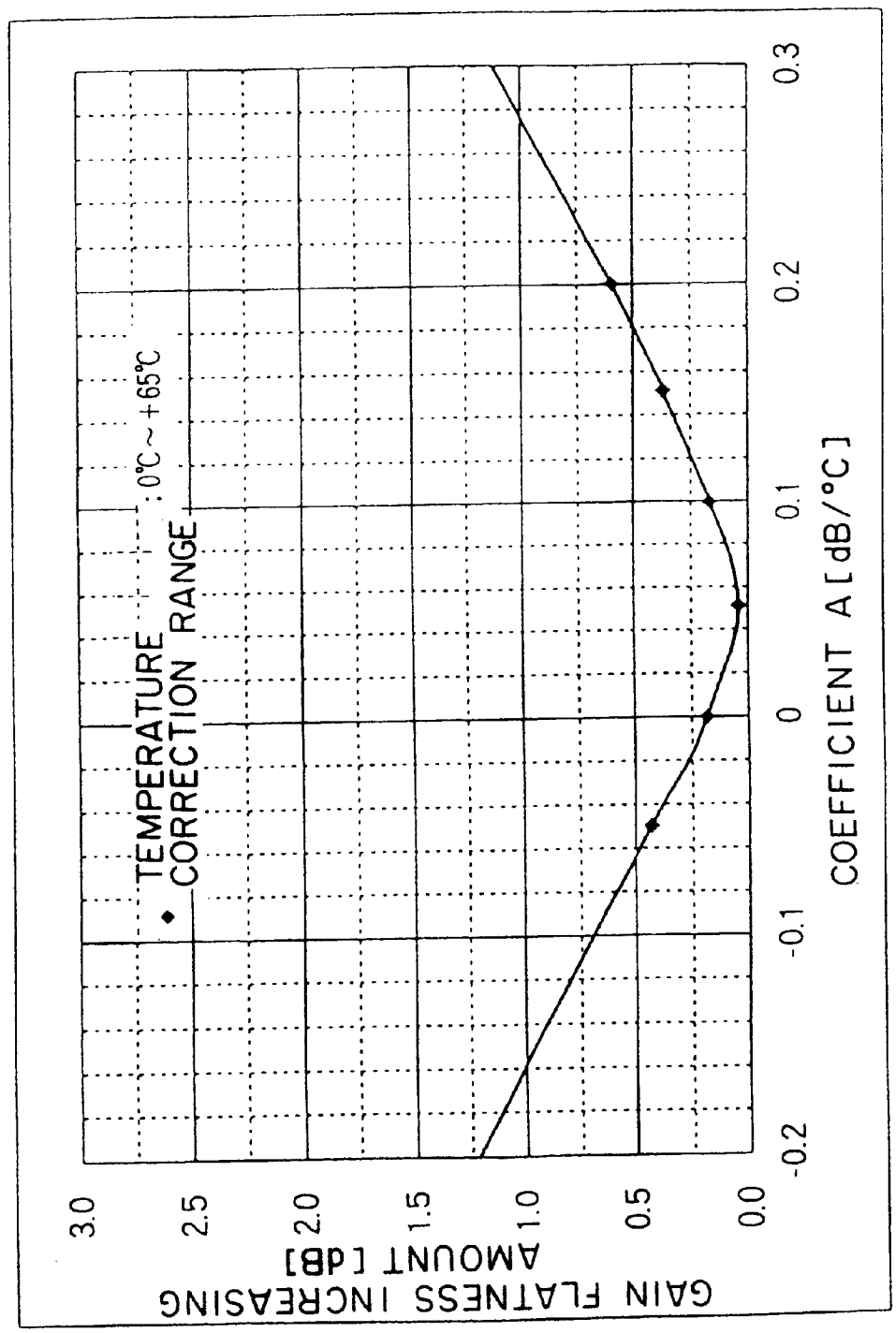
FIG. 25 is a graph showing a relationship between an optical variable attenuator setting value table and a gain flatness increasing amount for temperature correction, in the C band.

FIG. 25 shows a relationship between temperature correction tables of the optical variable attenuator and gain flatness increasing amounts. More specifically, FIG. 25 shows how much the worst value of the gain flatness (=$G^{max}-G^{min}$) is increased when the input optical signal intensity is constant (=−24 dBm/ch)(−24 dBm per one wave; −15 dBm in total for eight waves), the output optical signal intensity is constant (=+0.0 dBm/ch)(+0.0 dBm per one wave; +9.0 dBm in total for eight waves), and the EDF temperature is changed up to −0° C. to 65° C. in each optical variable attenuator setting value table of FIG. 23. In this case, the gain flatness=0.4 dB at the EDF temperature of 25° C. is used as a reference. In case of coefficient A=+0.05, regardless of the change in EDF temperature, the increasing amount for maintaining the gain flatness to 0.4 dB becomes 0 dB. The values shown in FIG. 25 are equal to gain flatness guaranteed minimum values within the EDF temperature range from −0 ° C. to +65° C. when the gain flatness is 0 dB. In FIG. 25, plots indicate actual measured values, and a curve is an approximation curve. It can be seen that, as the linear approximation coefficient A is changed, the gain flatness is worsened (increased). When it is assumed that an upper limit of the gain flatness increasing amount is 1 dB, an allowable range for the coefficient A becomes −0.16 to 0.26 [dB/° C.].

Figure 26:
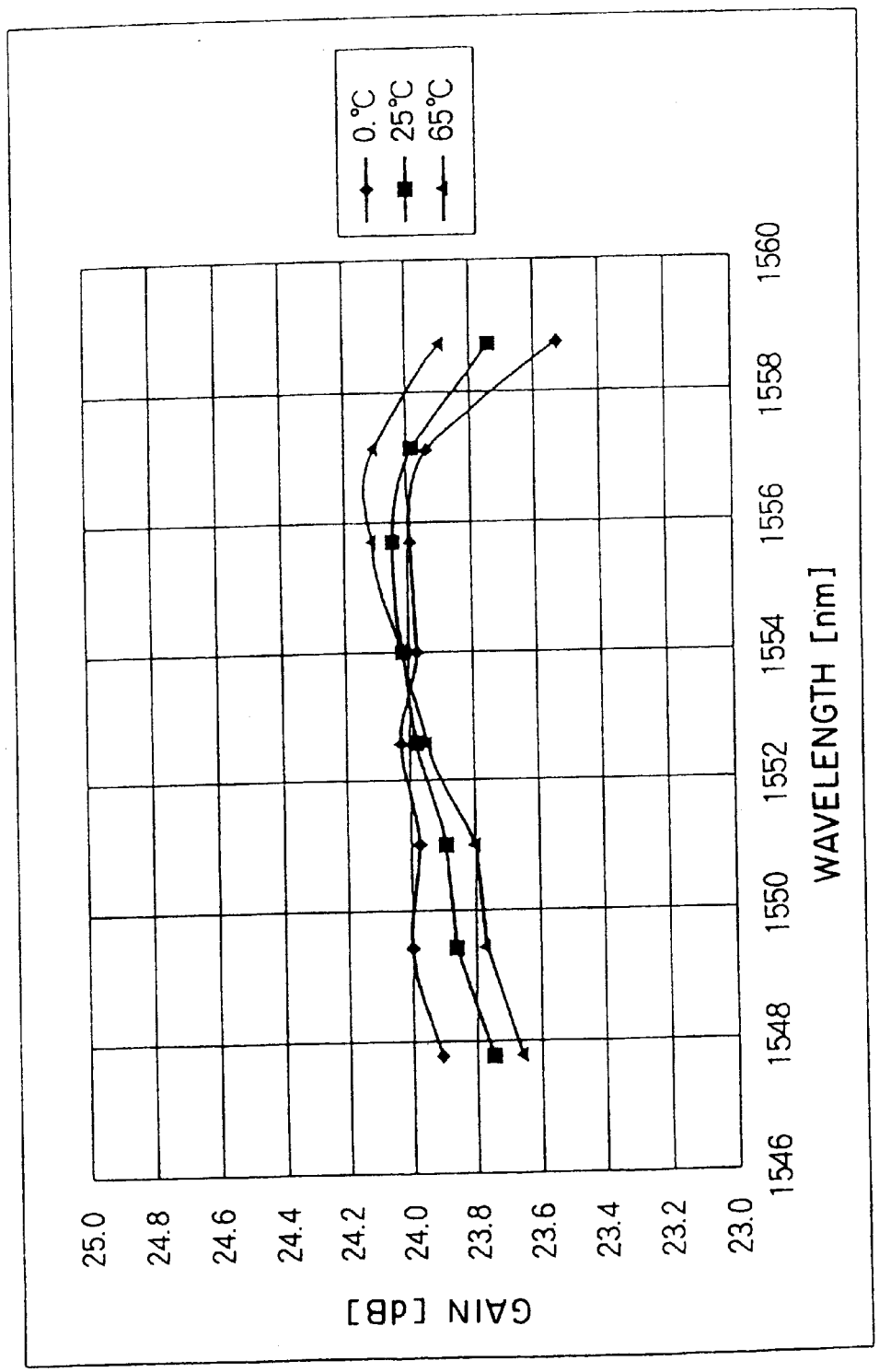
FIG. 26 is a graph showing a gain spectrum temperature property in the C band of the amplifier of FIG. 2, in a condition that temperature correction is not effected.

FIG. 26 shows the gain spectrum temperature property, i.e., the property obtained when the attenuation amount of the optical variable attenuator is fixed to 5.4 dB and the temperature control is not effected. In this case, it can be seen that, when the EDF temperature is changed to 0° C., 25° C. and 65° C., the gain wavelength property is changed.

Incidentally, the input level to the optical amplifier is −24.0 dBm/ch, and the output level is +15.5 dBm/ch.

Figure 27:
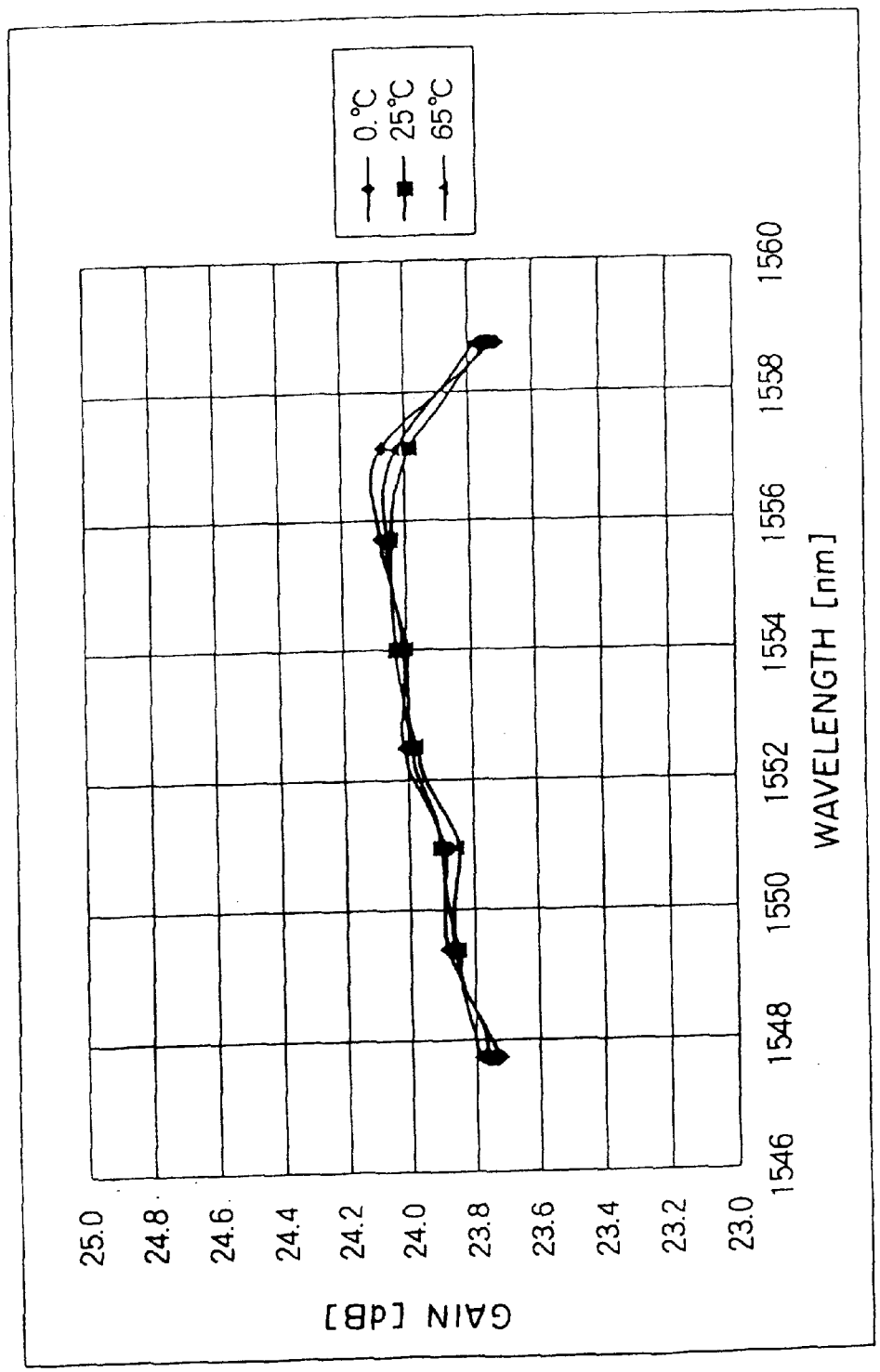
FIG. 27 is a graph showing a gain spectrum temperature property in the L band of the amplifier of FIG. 2, in a condition that temperature correction is effected.

FIG. 27 shows the gain spectrum temperature property, i.e., the property obtained when the temperature correction is effected by changing the attenuation amount of the optical variable attenuator as shown in FIG. 28 in accordance with the temperature. In this case, it can be seen that, even when the EDF temperature is changed to 0° C., 25° C. and 65° C., the wavelength dependency of the gain is not almost changed. Incidentally, the input level to the optical amplifier is −24.0 dBm/ch, and the output level is 0.0 dBm/ch. As can be seen from the comparison with FIG. 26 (with no temperature correction), the wavelength dependency of the gain is improved.

FIG. 28 shows an example of setting tables of the optical variable attenuator used by the calculation control circuit 12. As can be seen from the regression line and the regression equation shown in FIG. 28, an inclination of the line is 0.05. The input level to the optical amplifier is −24.0 dBm/ch, and the output level is 0.0 dBm/ch.

In the above-mentioned embodiments, while an example that only the rare earth doped fibers are considered with respect to the temperature was explained, in the entire optical amplifier, since the light loss amount of the optical part used and the temperature dependency of the wavelength property are added, it is considered that a numerical value table for optical amplifier temperature v.s. optical attenuation amount obtained by adding correction value to the above-mentioned equation be provided and control be effected on the basis of such a table in order to perform higher accurate control. Alternatively, the operation may be performed while adding any inclination to the gain property by deviating the control value by a given amount.

Regarding the optical attenuation amount of the optical variable attenuator used by the calculation control circuit, if there is change in light intensity of the input optical signal to the optical amplifier, light intensity of the output optical signal from the optical amplifier and/or insertion loss amount of the optical part, as well as the change in temperature, tables for correcting such factors, i.e., in addition to an optical attenuation amount table for temperature correction, an optical attenuation amount table for input optical signal intensity correction, an optical attenuation amount table for output optical signal intensity correction and an optical attenuation amount table for insertion loss amount correction may be prepared and the optical attenuation amount of the optical variable attenuator may be controlled by overlapping such tables. For example, the control can be effected by overlapping the optical attenuation amount table for temperature correction with the optical attenuation amount table for input optical signal intensity correction, output optical signal intensity correction or insertion loss amount correction, and, when an equation obtained by applying the regression lines based on the method of least squares to both tables is represented by "optical attenuation amount=coefficient A×temperature [° C.]+coefficient B×(optical amplifier output optical signal intensity−optical amplifier input optical signal intensity+optical part insertion loss amount) [dB]+any coefficient", by selecting so that the coefficient A becomes −0.16 [dB/° C.] to −0.04 [dB/° C.] and the coefficient B becomes −0.8 [dB/dB] to −1.2 [dB/dB], the change in gain spectrum of the optical amplifier can be reduced regardless of the change in EDF temperature, input optical signal intensity, output optical signal intensity and insertion loss amount.

Third Embodiment

Figure 30:
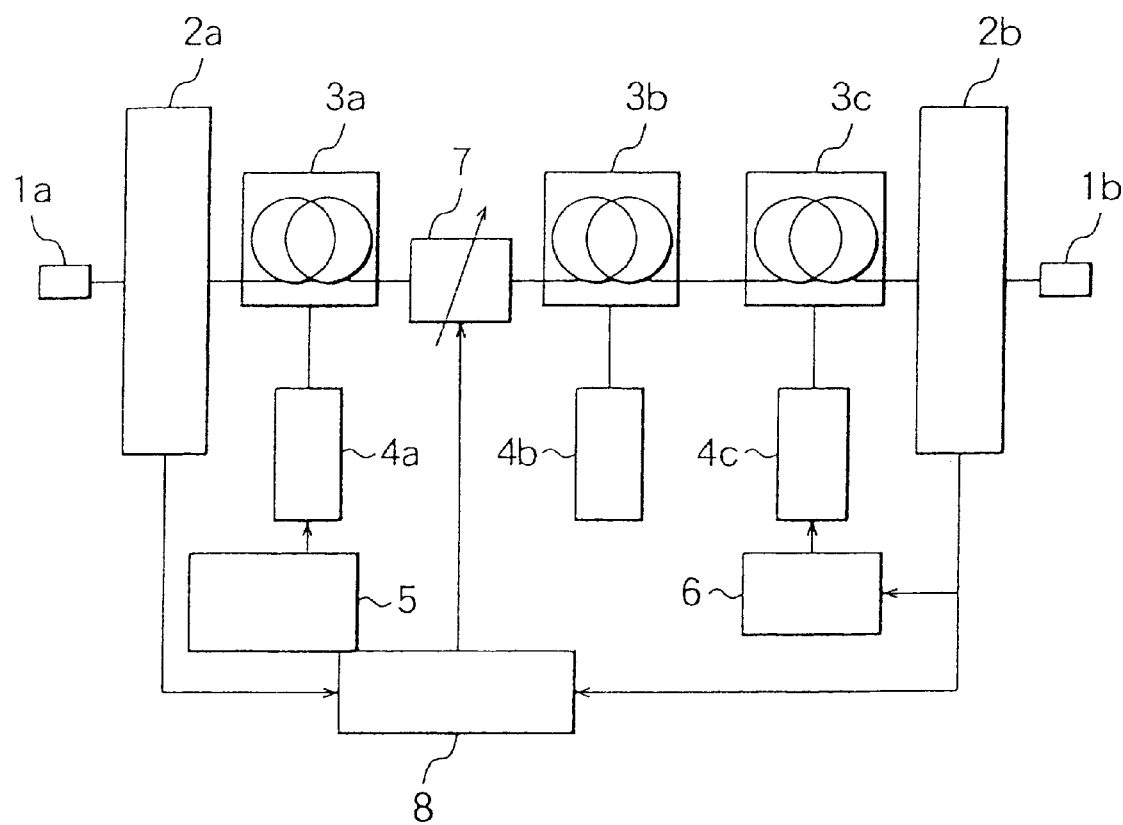
FIG. 30 is an explanatory view showing an optical amplifier according to a third embodiment of the present invention.

FIG. 30 shows an optical amplifier according to a third embodiment of the present invention. The optical amplifier is constituted by connecting rare earth doped optical fibers (optical fiber amplifiers) 3a, 3b, 3c in a three-stage fashion and comprises an input optical connector 1a, an output optical connector 1b, an input optical signal monitor 2a, an output optical signal monitor 2b, pumping light sources 4a, 4b, 4c, a pumping light source current constant control circuit (ACC) or constant output control circuit (APC) 5, an optical signal output constant control circuit (ALC) 6, an optical variable attenuator (ATT) 7, and a calculation control circuit 8 for controlling the optical variable attenuator 7.

The calculation control circuit 8 includes optical attenuation amount tables for changing the attenuation amount of the optical variable attenuator 7 and is adapted to receive the signals from the input optical signal monitor 2a and the output optical signal monitor 2b to change the optical attenuation amount of the optical variable attenuator 7 on the basis of these signals.

In the optical amplifier shown in FIG. 30, light intensity of light outputted from the input optical connector 1a is measured by the input optical signal monitor 2a, and the light is subjected to optical amplification by stimulated emission in the optical fiber amplifier 3a pumped by the pumping light source 4a controlled to the constant current or constant light intensity by means of the constant output control circuit 5. The optical signal passes through the optical variable attenuator 7 and is subjected to optical amplification in the optical fiber amplifier 3b pumped by the pumping light source 4b controlled by any controlling method and then is subjected to light amplification in the last stage optical fiber amplifier 3c pumped by the pumping light source 4c. Then, the optical signal passes through the output optical signal monitor 2b and is emitted from the output optical connector 1b. In this case, the output optical signal measured in the output optical signal monitor 2b is inputted to the optical signal output constant control circuit (ALC) 6, so that the pumping light source 4c is controlled so that output thereof becomes a predetermined value. At the same time, the signals from the input optical signal monitor 2a and the output optical signal monitor 2b are inputted to the calculation control circuit 8, so that the optical variable attenuator 7 is controlled as follows:

> Optical attenuation amount=coefficient A×(optical amplifier output optical signal intensity−optical amplifier input optical signal intensity)[dB]+any coefficient Here, coefficient A=0.8 [dB/dB] to −1.1 [dB/dB] is satisfied.

Figure 31:
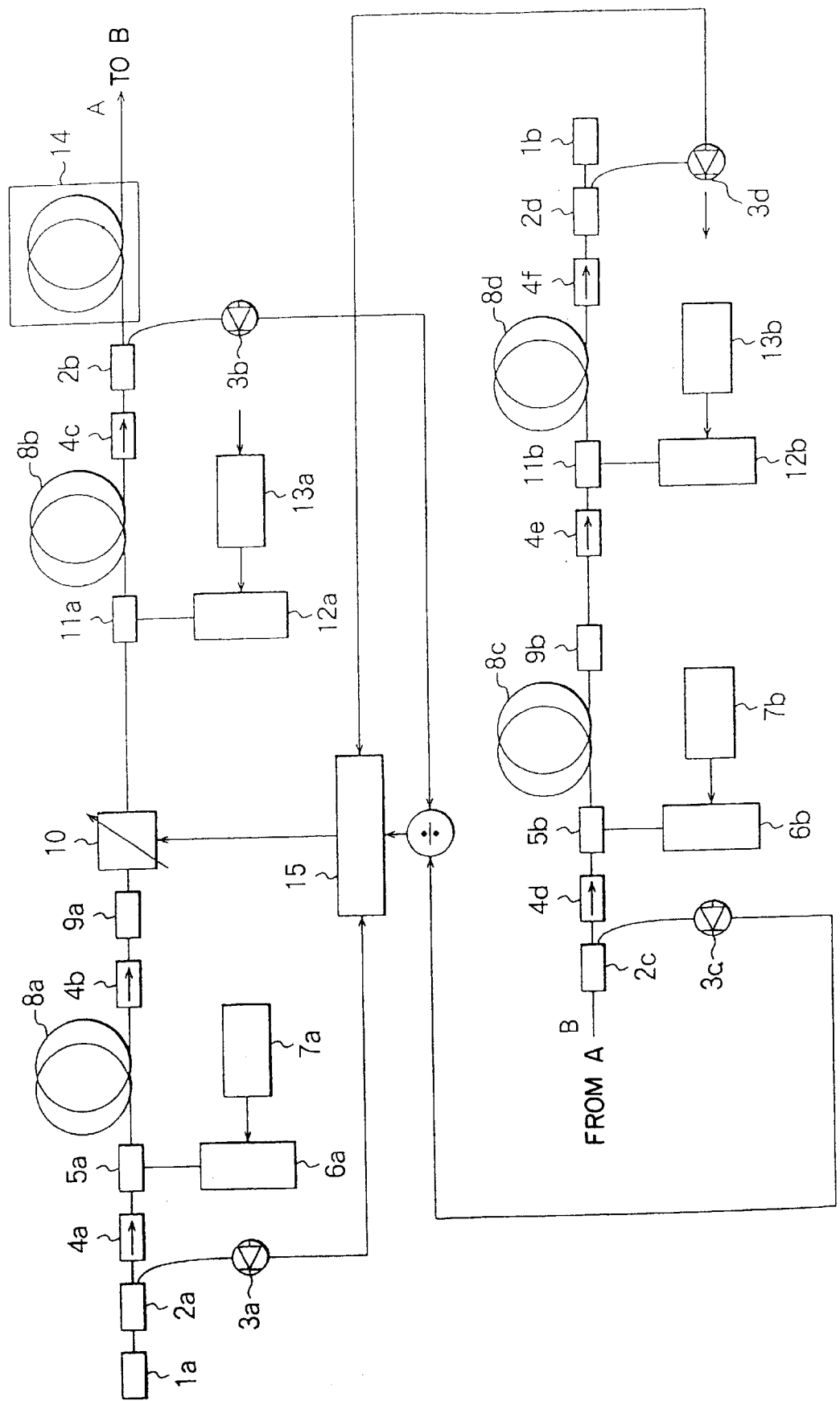
FIG. 31 is an explanatory view showing an optical amplifier according to a fourth embodiment of the present invention.

As is in FIG. 31, if there are any optical part between the optical fiber amplifier stages, the above equation can be expanded as the following equation:

> Optical attenuation amount=coefficient A×(optical amplifier output optical signal intensity−optical amplifier input optical signal intensity+insertion loss of optical part)[dB]+any coefficient In FIGS. 30 and 31, a plurality of optical variable attenuators may be provided. In such a case, the following equation is adopted:

> Total optical attenuation amount=coefficient A×(optical amplifier output optical signal intensity−optical amplifier input optical signal intensity+insertion loss of optical part)[dB]+any coefficient Thus, even when the input optical signal intensity is changed and the setting value of the output optical signal intensity is altered, the operation in which the gain spectrum is kept constant can be performed.

Figure 41:
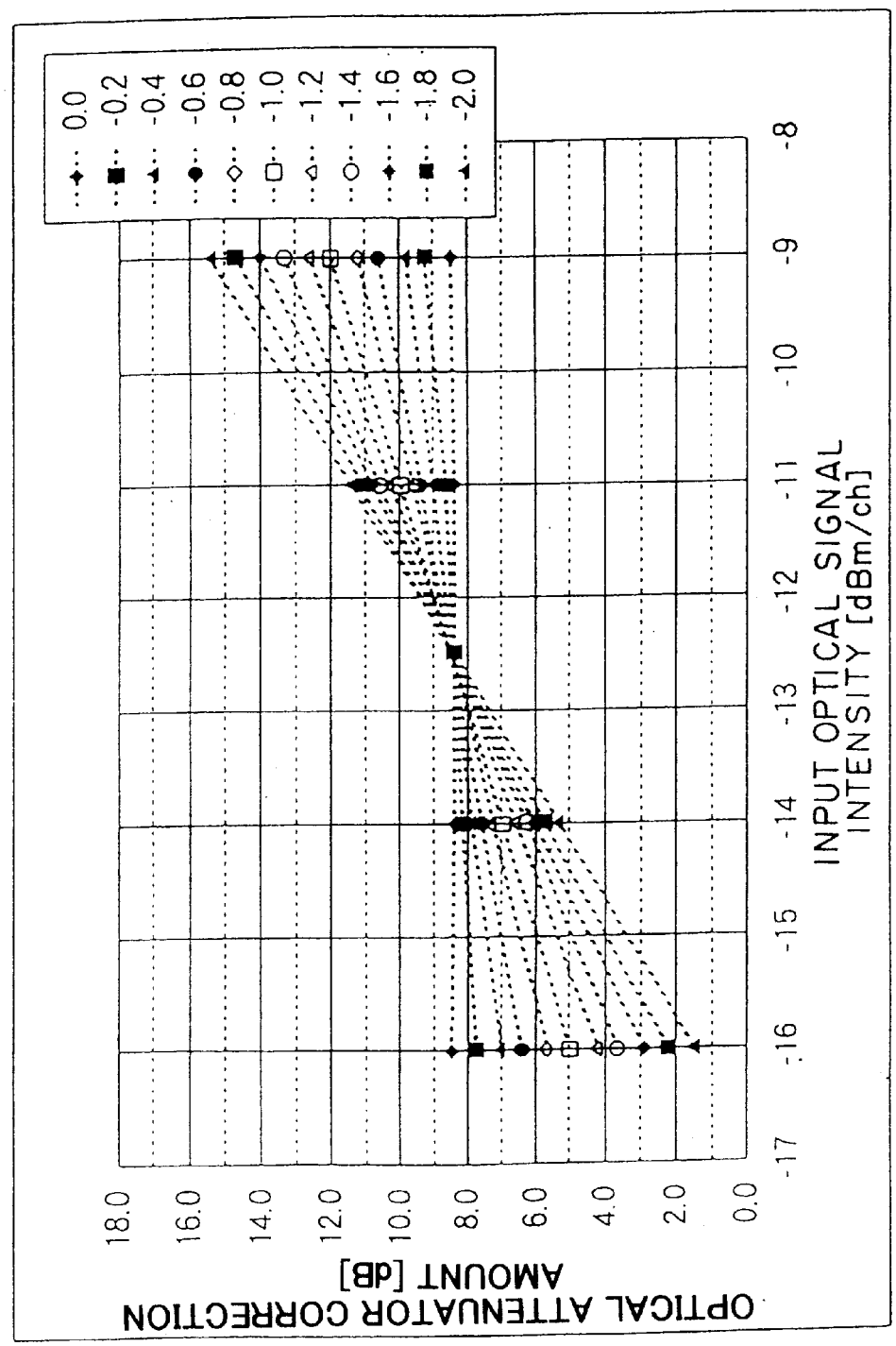
FIG. 41 is a graph showing an example of an optical variable attenuator setting value table for effecting correction regarding change in input optical signal intensity.

FIG. 41 shows an example of setting value tables of the optical variable attenuator (in the calculation control circuit 8 of FIG. 30) for effecting correction with respect to the change in input optical signal intensity. Each of the setting value tables of the optical variable attenuator is represented by using coefficient A from a regression line equation "optical variable attenuator correction amount (optical attenuation amount)=coefficient A [dB/dB]×(output optical signal intensity−input optical signal intensity+optical part insertion loss amount) [dB]+any coefficient" obtained by applying the regression line based on the method of least squares. The optical variable attenuator setting value table is set so that it becomes 8.5 dB when the input optical signal intensity is −12.5 dBm/ch (−12.5 dBm per one wave; −3.5 dBm in total for eight waves), the output optical signal intensity is +15.5 dBm/ch (−12.5 dBm per one wave; +24.5 dBm in total for eight waves) and the insertion loss amount of the optical part is 3 dB.

Figure 42:
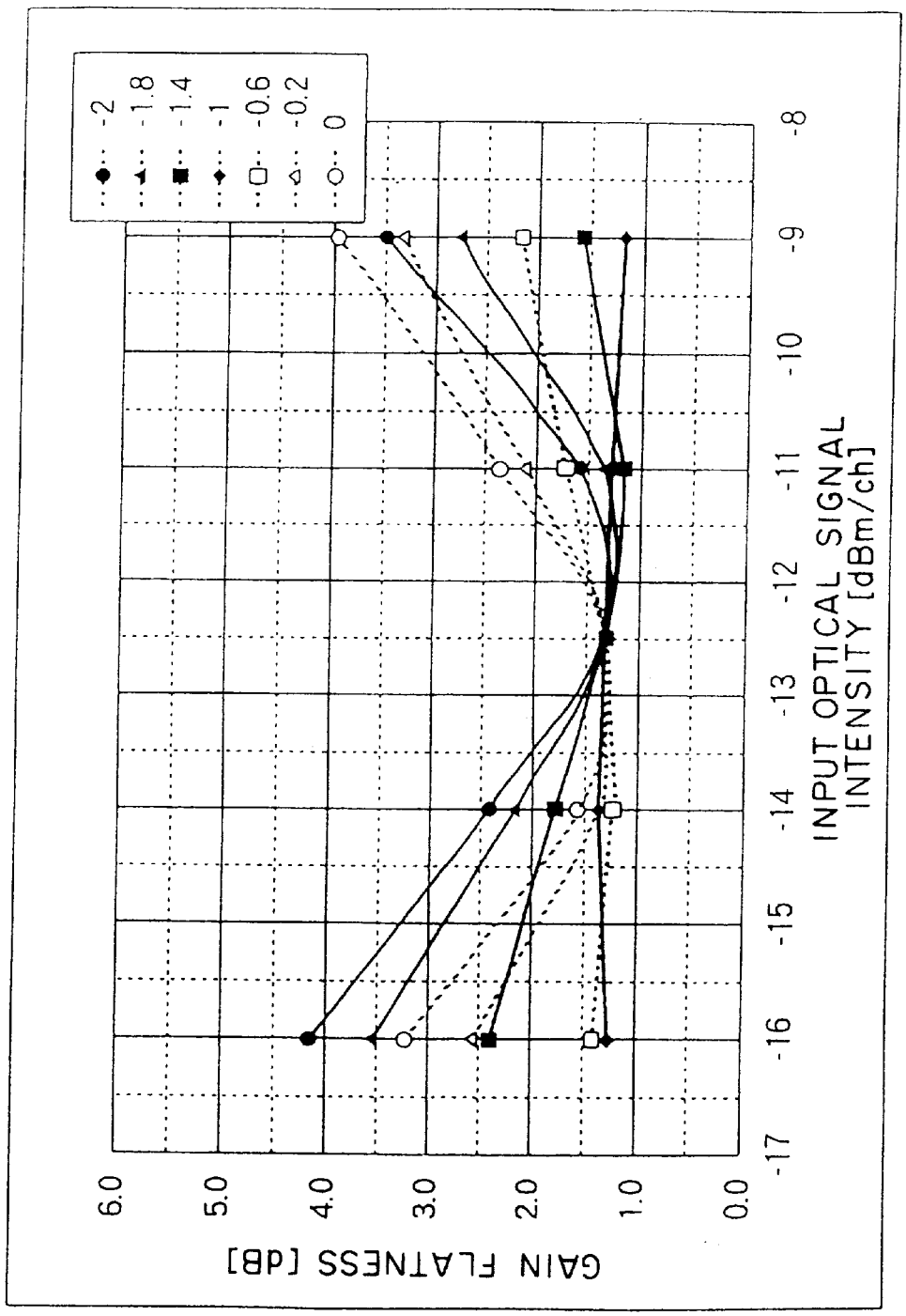
FIG. 42 is a graph showing an example of a relationship between an optical variable attenuator setting table and gain flatness.

FIG. 42 shows a relationship between the optical variable attenuator setting value tables and the gain flatness. More specifically, FIG. 42 shows how much the gain flatness ($=G^{max}-G^{min}$) is changed when the EDF temperature is constant (=25° C.), the output optical signal intensity is constant (=+15.5 dBm/ch)(−12.5 dBm per one wave; +24.5 dBm in total), and the input optical signal intensity is changed from −16 dBm/ch to −9 dBm/ch (from −16 dBm to −9 dBm per one wave; from −7 dBm to +10 dBm in total for eight waves) in each optical variable attenuator setting value table of FIG. 41. Based on the gain flatness =1.3 dB at the EDF temperature of 25° C. (as a reference), when it is checked how much the gain flatness is increased within the input optical signal intensity range from −16 dBm to −9dBm, in case of coefficient A=−1.0, the gain flatness becomes 0 dB, and, in case of coefficient A=−2.0, the gain flatness becomes 2.8 dB.

Figure 43:
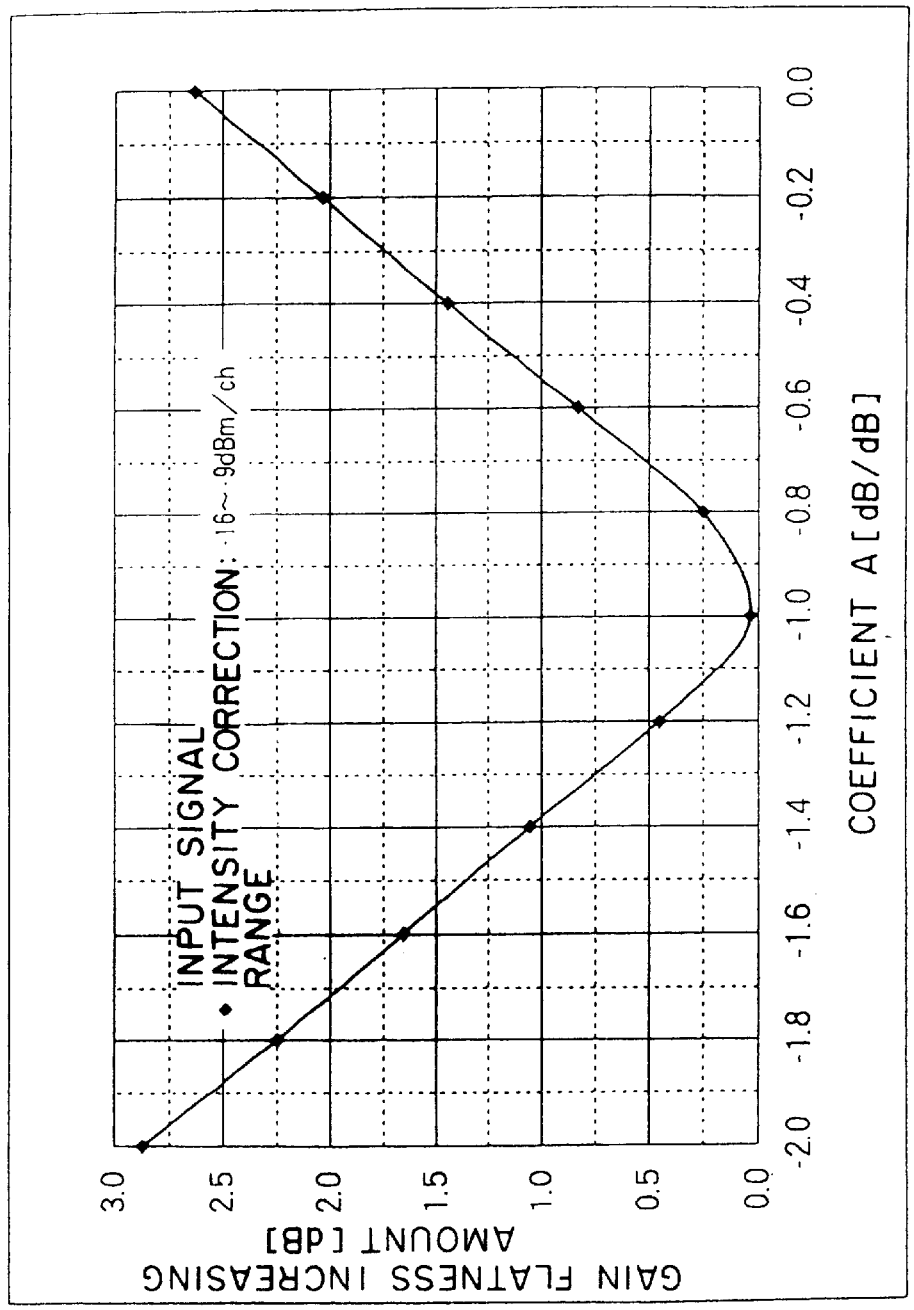
FIG. 43 is a graph showing an example of a relationship between an input signal intensity correcting optical variable attenuator and linear approximation coefficient A.
Figure 44:
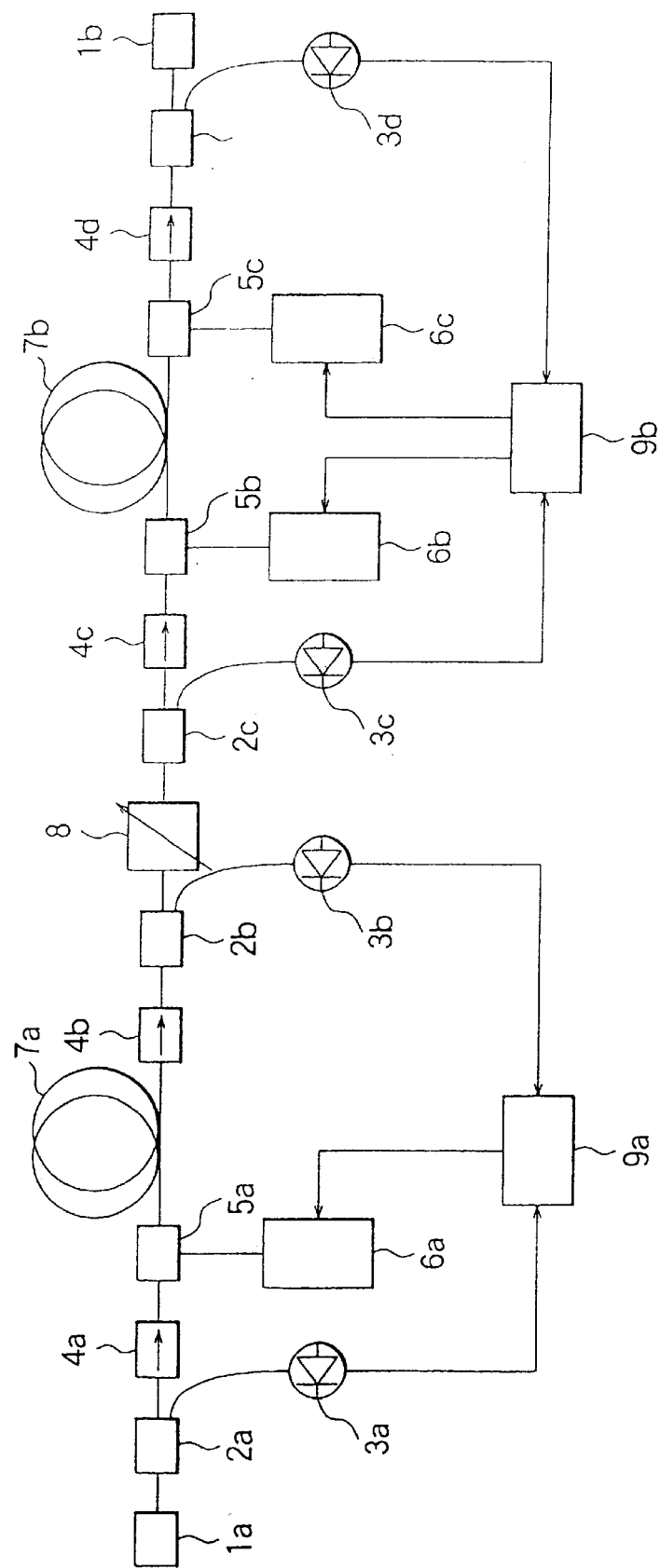
FIG. 44 is an explanatory view showing an example of a conventional two-stage optical amplifier.

FIG. 43 shows a relationship between the input optical signal intensity correction optical variable attenuator and the linear approximation coefficient A. More specifically, FIG. 43 shows how much the worst value of the gain flatness ($=G^{max-Gmax}$) is increased when the EDF temperature is constant (=25 ° C.), the output optical signal intensity is constant (=+15.5 dBm/ch)(−12.5 dBm per one wave; +24.5 dBm in total), and the input optical signal intensity is changed from −16 dBm/ch to −9 dBm/ch (from −16 dBm to −9 dBm per one wave; from −77 dBm to +0 dBm in total for eight waves) in each optical variable attenuator setting value table of FIG. 41. In this case, the gain flatness=1.3 dB at the input optical signal intensity of 12.5 dBm/ch is used as a reference. In case of coefficient A=−1.0, regardless of the input optical signal intensity, the increasing amount for maintaining the gain flatness to 1.3 dB becomes 0 dB. The values shown in FIG. 43 are equal to gain flatness guaranteed minimum values within the input optical signal intensity range from −16 dBm/ch to −9 dBm/ch when the gain flatness is 0 dB. In FIG. 43, plots indicate actual measured values, and a curve is an approximation curve. It can be seen that, as the linear approximation coefficient A is changed, the gain flatness is worsened (increased). When it is assumed that an upper limit of the gain flatness increasing amount is 0.25 dB, an allowable range for the coefficient A becomes −1.1 to −0.8 [dB/dB].

Noise figure NF of the entire optical amplifier of FIG. 30 is represented as follows:

$$NF=NF1+(NF2-\alpha)/\alpha G$$

Where, NF1 is noise figure of the first stage of the optical amplifier, NF2 is total noise figure of stages of the optical amplifier other than the first stage, α is a loss amount between the stages, and G is gain of the first stage of the optical amplifier (all are linear scale).

In the control system of the optical amplifier of FIG. 30, even if the input optical signal intensity becomes small, it is not required that the pumping light intensity of the first stage optical fiber amplifier which is preferential to the noise index of the entire optical amplifier be reduced, and, further, since the gain becomes great at small input optical signal intensity, the noise figure can be reduced.

Fourth Embodiment

FIG. 31 shows an optical amplifier according to a fourth embodiment of the present invention. The optical amplifier is of multi-stage type and comprises an input optical connector 1a, an output optical connector 1b, optical couplers or beam splitters 2a, 2b, 2c, 2d, monitors PD 3a, 3b, 3c, 3d, optical isolators 4a, 4b, 4c, 4d, 4e, 4f, pumping light/optical signal wavelength-division multiplexers 5a, 5b, 11a, 11b, pumping light sources 6a, 6b, 12a, 12b, pumping light source control circuits (APC, ALC) 7a, 7b, 13a, 13b, optical fiber amplifiers 8a, 8b, 8c, 8d, optical filters 9a, 9b, an electrically-powered optical variable attenuator 10, and an electrically-powered calculation control circuit 15 for controlling the optical variable attenuator, and a replaceable optical part 14 having limitation to input optical signal intensity is inserted between stages.

Similar to the calculation control circuit 8 of FIG. 30, the above calculation control circuit 15 includes optical attenuation amount tables for changing the attenuation amount of the optical variable attenuator 10 of FIG. 31 and is adapted to receive the signals from the monitors PD 3a, 3b, 3c, 3d to change the optical attenuation amount of the optical variable attenuator 10 on the basis of these signals.

Figure 40A:
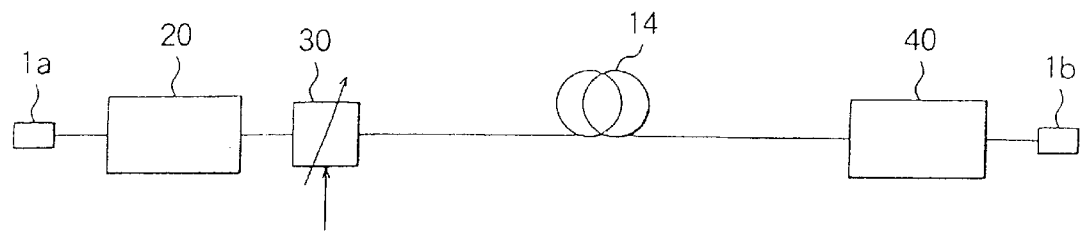
FIG. 40A is a view for explaining insertion when a dispersion compensating fiber is used as a replaceable optical part.
Figure 40B:
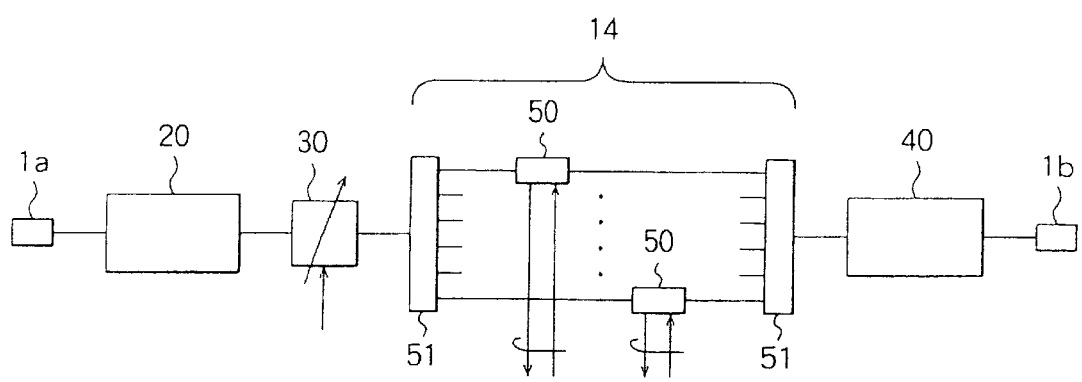
FIG. 40B is a view for explaining insertion when an optical ADM is used as a replaceable optical part.
Figure 40C:
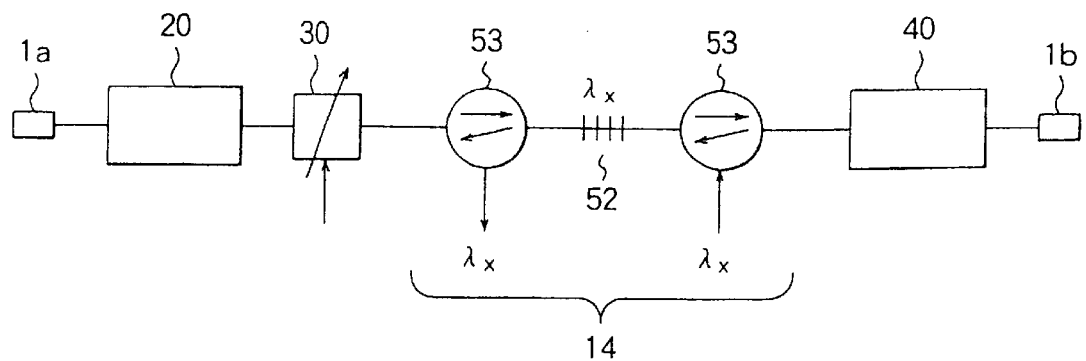
FIG. 40C is a view for explaining insertion when a combination of optical fiber grating and optical circulator is used as a replaceable optical part.

The said replaceable optical part 14 is used when it is desired to impart a dispersion compensating function or an optical ADM (add-drop-multiplexer; optical add-drop-module) function to the optical amplifier. The optical part 14 may be, for example, a dispersion compensating fiber 14 as shown in FIG. 40A, an optical ADM 14 comprised of a combination of a demultiplexer 51 and an optical switch 50 as shown in FIG. 40B, or a part 14 comprised of a combination of a fiber grating 52 and an optical circulator 53. The dispersion compensating fiber 14 (FIG. 40A), optical AMD 14 (FIG. 40B) and part 14 comprised of the combination of the fiber grating 52 and the optical circulator 53 (FIG. 40C) are inserted between the ATT 30 and the following stage optical fiber amplifier group 40.

In FIG. 31, a part of optical signal outputted from the input optical connector 1a is picked up by the beam splitter 2a and light intensity thereof is measured by the monitor PD 3a. The optical signal passes through the optical isolator 4a and is incident on the optical fiber amplifier 8a which is pumped by the pumping light source 6a controlled by the pumping light source control circuit (APC) 7a. In this optical fiber amplifier, the optical signal is subjected to optical amplification by stimulated emission. The optical-amplified optical signal passes through the optical isolator 4b and is attenuated for each wavelength by the optical filter 9a. Thereafter, the optical signal is incident on the electrically-powered optical variable attenuator 10. The light passed through the electrically-powered optical variable attenuator 10 is incident on the optical fiber amplifier 8b which is pumped by the pumping light source 12a controlled by the pumping light source control circuit (ALC) 13a, where the light is optical-amplified. The optical signal passes through the optical isolator 4c, and then, a part of the optical signal is picked up by the beam splitter 2b and light intensity thereof is measured by the monitor PD 3b.

The optical signal passed through the beam splitter 2b passes through the relpaceable optical part 14 and is incident on the beam splitter 2c, where a part of the light is picked up and light intensity thereof is measured by the monitor PD 3c. The optical signal passed through the optical isolator 4d is optical-amplified by the optical fiber amplifier 8c which is pumped by the pumping light source 6b controlled by the pumping light source control circuit (APC) 7b. Thereafter, the optical signal passes through the optical filter 9b and is subjected to gain spectrum correction. The optical signal passes through the optical isolator 4e and is incident on the final stage optical fiber amplifier 8d which is pumped by the pumping light source 12b controlled by the pumping light source control circuit (ALC) 13b, where the light is optical-amplified. Then, the light is incident on the optical isolator 4f. A part of the optical signal passed through the optical isolator 4f is picked up by the beam splitter 2d and the optical signal is emitted from the output optical connector 1b.

In the above-mentioned operation, the pumping light source 12a is controlled by the pumping light source control circuit 13a so that input light intensity to the optical part 14 does not exceed a predetermined limit value and a value of the monitor PD 3b becomes constant. The last-stage pumping light source 12b is also controlled by the pumping light source control circuit (ALC) 13b so that a value of the monitor PD 3d becomes constant.

Here, as mentioned above, by setting the control value of the electrically-powered optical variable attenuator 10 to satisfy "optical attenuation amount=A×(output optical signal intensity [dBm] detected by monitor PD 3d–input optical signal intensity [dBm] detected by monitor PD 3a+optical part input optical signal intensity [dBm] detected by monitor PD 3b–optical part output optical signal intensity [dBm] detected by monitor PD 3c)+any coefficient", output having given gain configuration can be obtained, regardless of the change in input optical signal intensity and the setting value of the output optical signal intensity. In actual, the electrically-powered optical variable attenuator 10 can sometimes have negligible wavelength dependency of insertion loss and, if a change width of the input optical signal intensity is great, error may be generated between the actual signal gain value (value "output optical signal intensity–input optical signal intensity") and the measured value (value of output monitor PD–value of input monitor PD). Further, in order to achieve higher accurate control, numerical table obtained by adding a certain correction value to the above-mentioned equation may be provided, and control may be effected on the basis of such a table.

FIGS. 32 to 35 show properties of an erbium doped silica fiber amplifier (EDFA) having 1530 nm band in which the pumping light/optical signal wavelength-division multiplexers 5a, 5b are pumping light sources having 980 nm band, the pumping light sources 6a, 6b are pumping light sources having 1480 nm band, the optical fiber amplifiers 8a, 8b, 8c, 8d are erbium doped silica fibers, the calculation control circuit 15 is an optical part having an optical attenuation amount of 15 dB in the optical amplifier of FIG. 31. The input optical signal is obtained by multiplexing eight wavelengths to 1530 nm to 1543 nm, and the output of the entire EDFA is set to +22 dBm and +19dBm.

Figure 32:
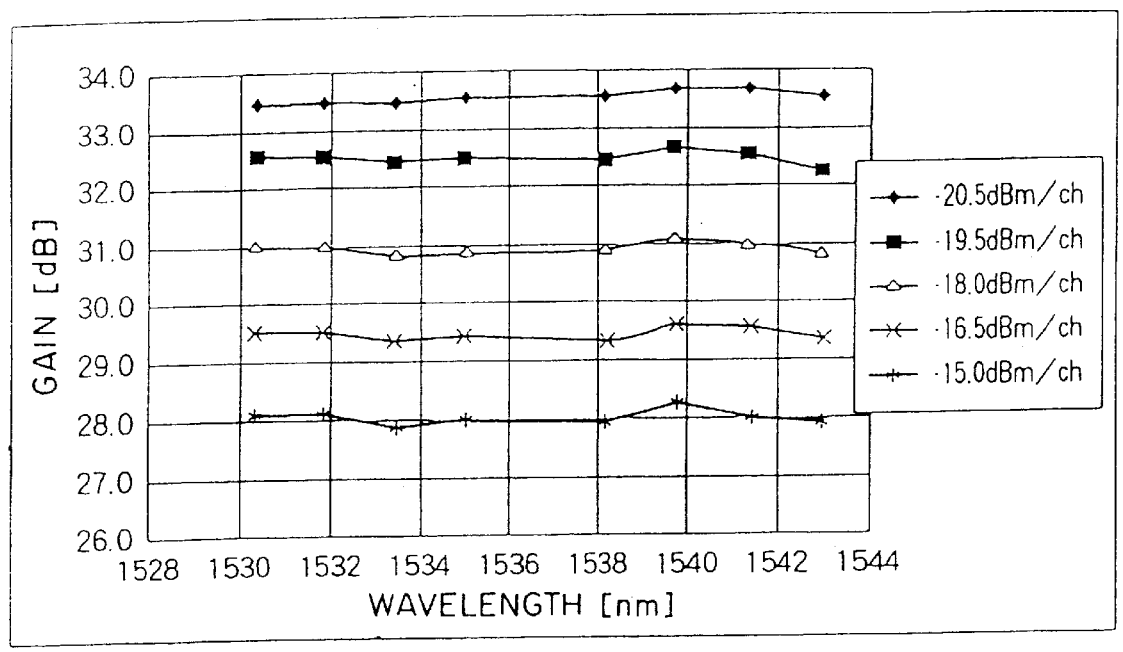
FIG. 32 is a graph showing a first example of a 1530 nm band EDFA gain spectrum property in the optical amplifier of FIG. 31.
Figure 33:
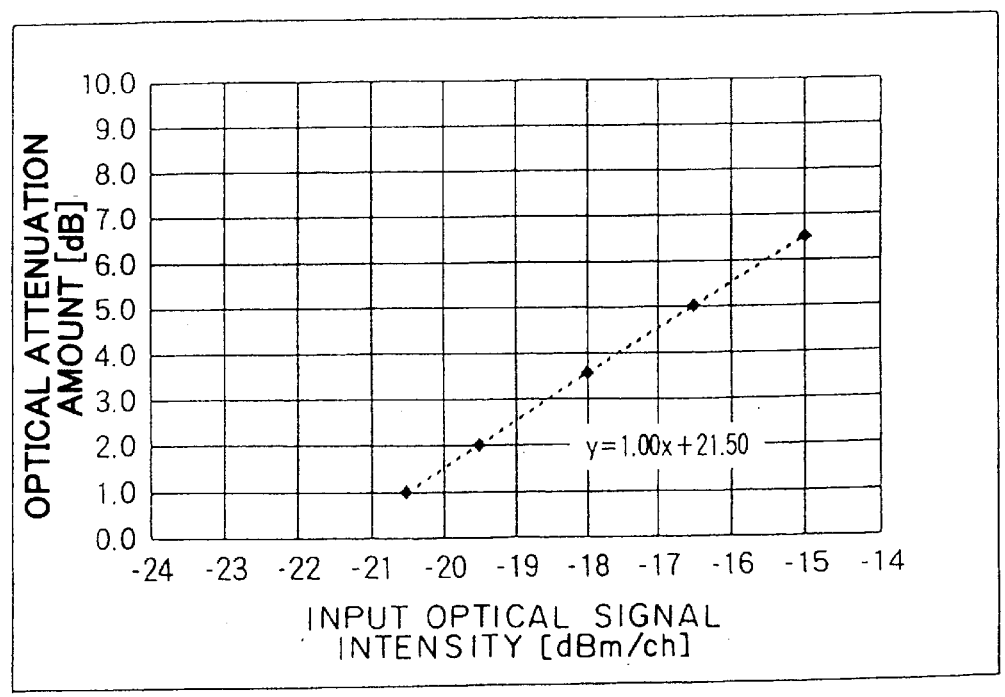
FIG. 33 is a graph showing a first example of a 1530 nm band EDFAn optical variable attenuator correction value in the optical amplifier of FIG. 31.
Figure 34:
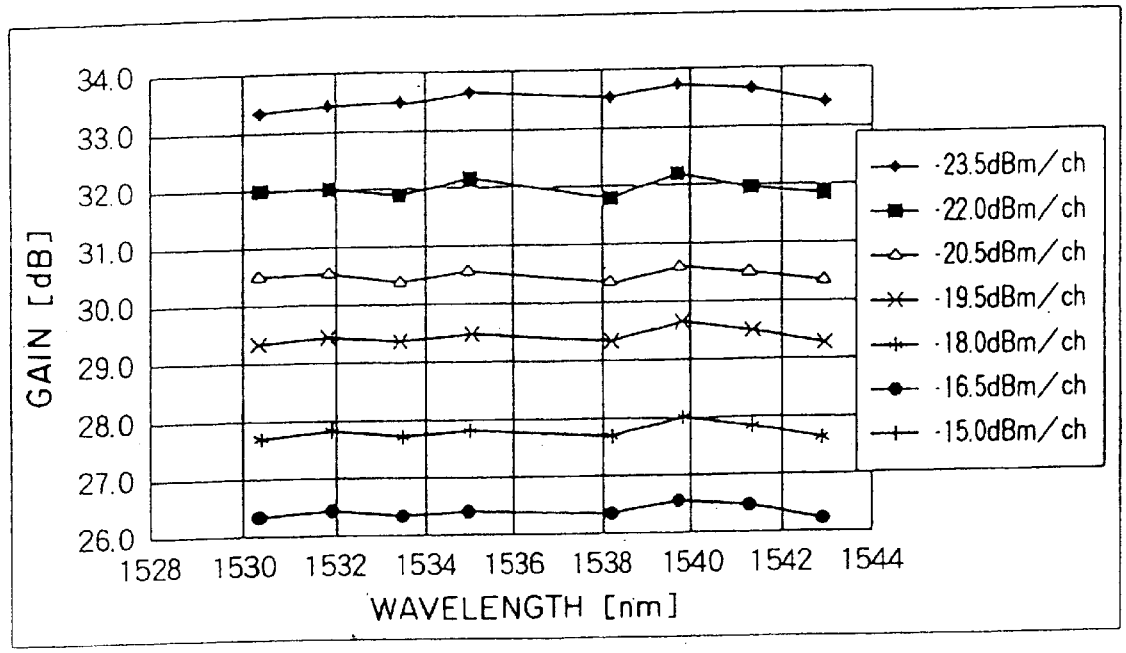
FIG. 34 is a graph showing a second example of a 1530 nm band EDFA gain spectrum property in the optical amplifier of FIG. 31.
Figure 35:
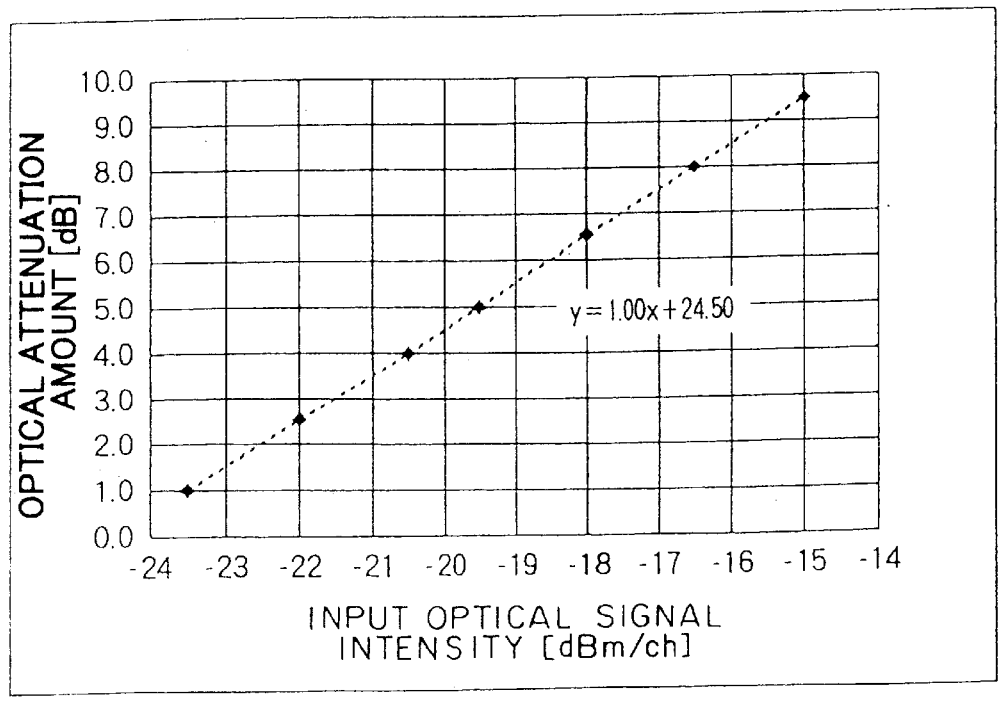
FIG. 35 is a graph showing a second example of a 1530 nm band EDFAn optical variable attenuator correction value in the optical amplifier of FIG. 31.

FIG. 32 shows the gain spectrum at the output of +22 dBm and FIG. 33 shows input optical signal v.s. optical attenuation amount control. In this case, the optical attenuation amount input optical signal intensity coefficient (coefficient A) is –1.00 [dB/dB]. FIG. 34 shows the gain spectrum at the output of +19 dBm and FIG. 35 shows input optical signal intensity v.s. optical attenuation amount control.

FIGS. 36 to 39 show properties of an erbium doped silica fiber amplifier (EDFA) having 1550 nm band in which the pumping light/optical signal wavelength-division multiplexers 5a, 5b are pumping light sources having 980 nm band, the pumping light sources 6a, 6b are pumping light sources having 1480 nm band, the optical fiber amplifiers 8a, 8b, 8c, 8d are erbium doped silica fibers, the electrically-powered attenuator calculation control circuit 15 is an optical part having an optical attenuation amount of 15 dB in the optical amplifier of FIG. 31. The input optical signal is obtained by multiplexing eight light wavelengths to 1547 nm to 1561 nm, and the output of the entire EDFA is set to +22 dBm and +19 dBm.

Figure 36:
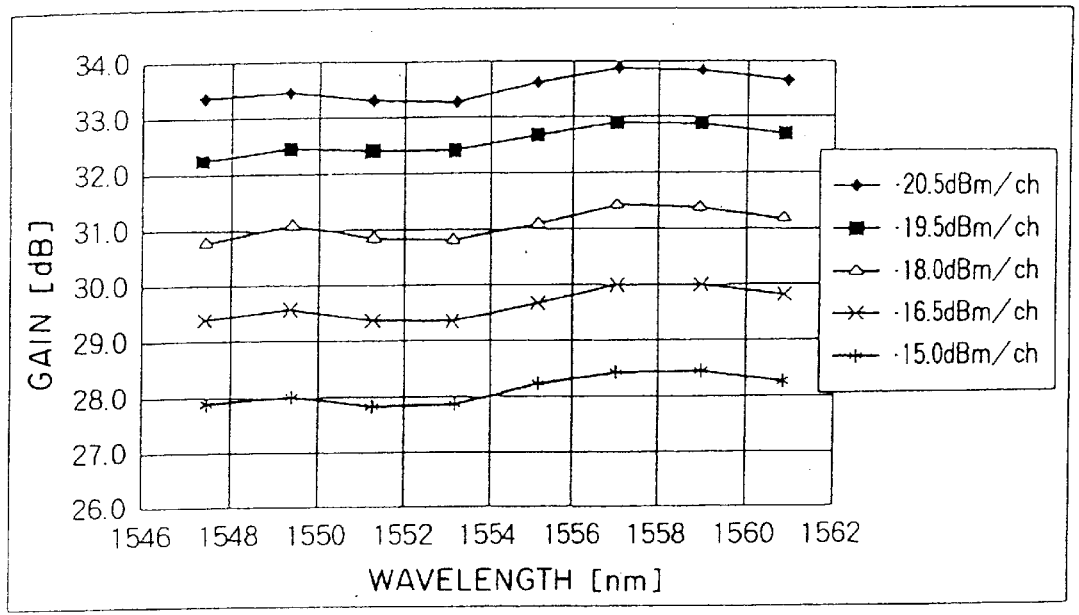
FIG. 36 is a graph showing a first example of a 1550 nm band EDFA gain spectrum property in the optical amplifier of FIG. 31.
Figure 37:
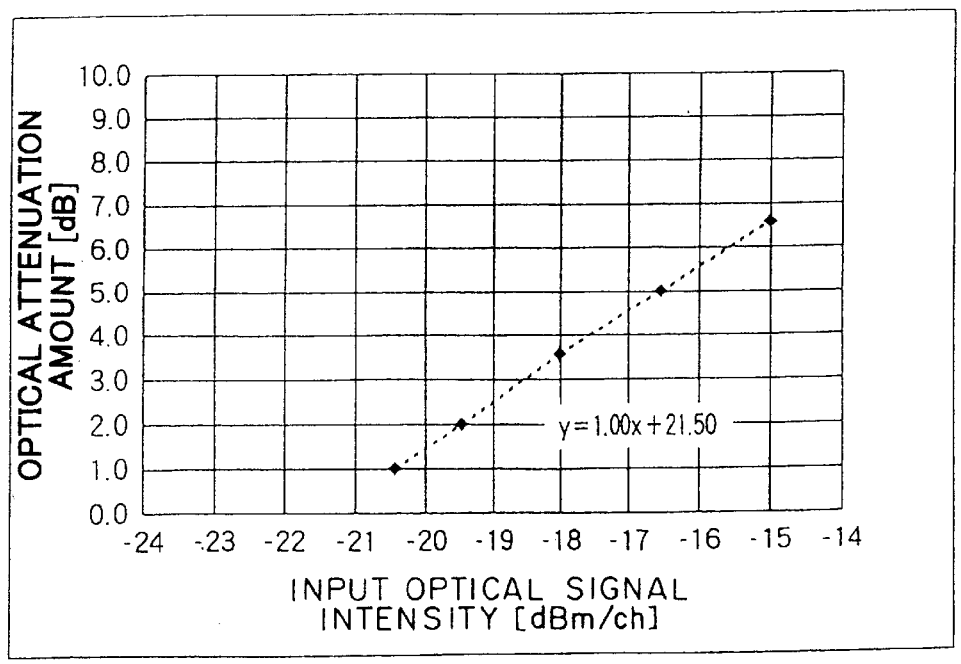
FIG. 37 is a graph showing a first example of a 1550 nm band EDFA optical variable attenuator correction value in the optical amplifier of FIG. 31.
Figure 38:
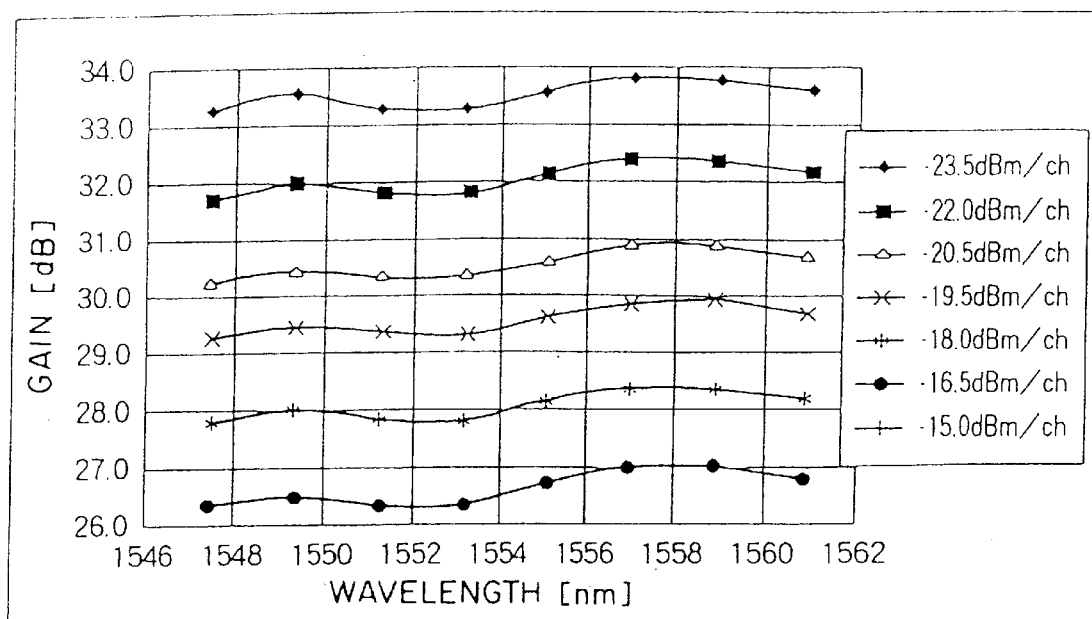
FIG. 38 is a graph showing a second example of a 1550 nm band EDFA gain spectrum property in the optical amplifier of FIG. 31.
Figure 39:
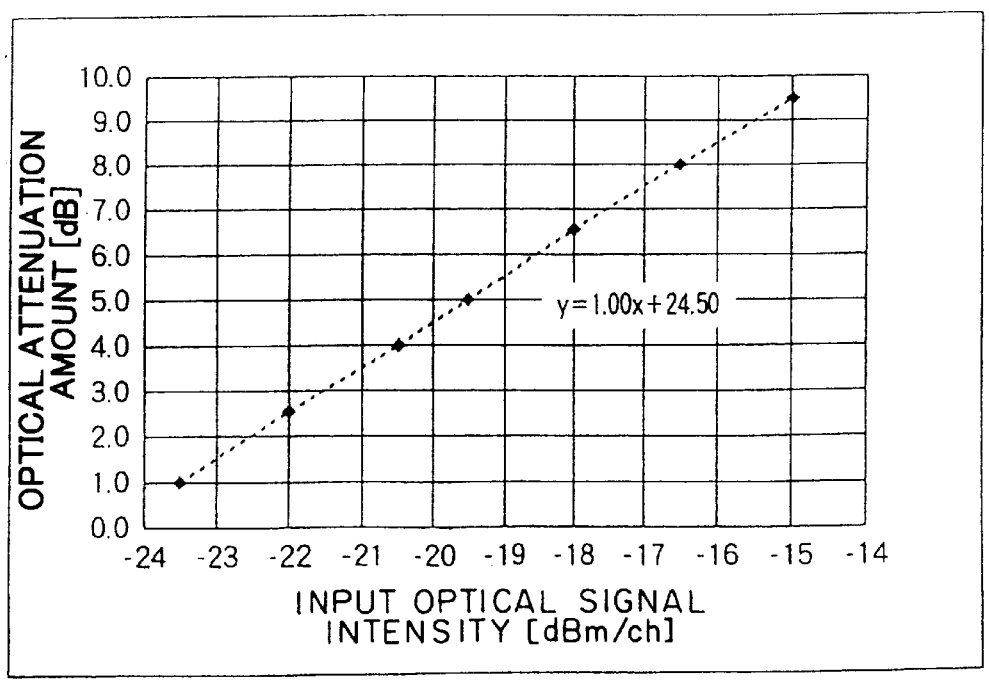
FIG. 39 is a graph showing a second example of a 1550 nm band EDFA optical variable attenuator correction in the optical amplifier of FIG. 31.

FIG. 36 shows the gain spectrum at the output of +22 dBm and FIG. 37 shows input optical signal intensity v.s. optical attenuation amount control. In this case, the optical attenuation amount input optical signal intensity coefficient (coefficient A) is –1.00 [dB/dB]. FIG. 38 shows the gain spectrum at the output of +19 dBm and FIG. 39 shows input optical signal intensity v.s. optical attenuation amount control.

Industrial Availability

According to the optical amplifier of the present invention, since the optical attenuation amount of the optical variable attenuator means is changed on the basis of the temperature of the rare earth doped fibers or the environmental temperature to compensate the temperature dependency of the optical amplifier, amplification of the wavelength-division multiplexed optical signal can be effected while substantially suppressing gain spectrum temperature fluctuation.

According to the optical amplifier of the present invention, if the replaceable optical part is disposed between the rare earth doped optical fibers, since the optical attenuation amount of the optical variable attenuator means is changed on the basis of the temperature of the rare earth doped fibers or the environmental temperature to compensate the temperature dependency of the optical amplifier, amplification of the wavelength-division multiplexed optical signal can be effected while substantially suppressing gain spectrum temperature fluctuation.

According to the optical amplifier of the present invention, if the input optical signal intensity is changed and the setting of the output optical signal intensity is altered, the optical amplification can be achieved while keeping the gain spectrum constant.

According to the optical amplifier of the present invention, also in a small input signal area within the operating input optical signal intensity range, since the pumping light intensity in the first stage optical fiber amplifier which is preferential to the noise figure of the entire optical amplifier is not required to be reduced and the gain can be increased regarding the small input signal, the noise figure can be reduced.

What is claimed is:

1. An optical amplifier having a plurality of rare earth doped optical fibers in a multi-stage, comprising:

one or more optical variable attenuator means;

detecting means for detecting a temperature of the rare earth doped optical fibers themselves or an environmental temperature; and attenuation amount control means for changing an optical attenuation amount of said optical variable attenuator means on the basis of the temperature of said rare earth doped optical fibers or the environmental temperature detected by the detecting means.

2. An optical amplifier having a plurality of rare earth doped optical fibers in a multi-stage, comprising:

a replaceable optical part between said rare earth doped optical fibers;

one or more optical variable attenuator means;

detecting means for detecting a temperature of the rare earth doped optical fibers themselves or an environmental temperature; and attenuation amount control means for changing an optical attenuation amount of said optical variable attenuator means on the basis of the temperature of said rare earth doped optical fibers or the environmental temperature detected by the detecting means.

3. An optical amplifier according to claim 1 or 2, wherein said attenuation amount control means has an optical attenuation amount table associated with the temperature, and the optical attenuation amount of said optical variable attenuator means is changed on the basis of said optical attenuation amount table.

4. An optical amplifier according to claim 3, wherein, when an equation obtained by applying the regression line based on the method of least squares to said optical attenuation amount table is represented by "optical attenuation amount=coefficient A [dB/° C.]×temperature [° C. ]+any coefficient", the coefficient A is selected to be within a range from −0.16 [dB/° C.] to +0.26 [dB/° C.].

5. An optical amplifier according to claim 3, wherein a wavelength band of optical signal inputted to the optical amplifier includes 1580 to 1590 nm, and, when an equation obtained by applying the regression line based on the method of least squares to said optical attenuation amount table is represented by "optical attenuation amount= coefficient A [dB/° C.]×temperature [° C.]+any coefficient", the coefficient A is selected to be within a range from −0.16 [dB/° C.] to −0.04 [dB/° C.].

6. An optical amplifier according to any one of claims 1 to 5, wherein said attenuation amount control means changes the optical attenuation amount of said optical variable attenuator means by using one or plural or all of intensity of input optical signal to the optical amplifier, an insertion loss amount of said replaceable optical part and intensity of output optical signal from the optical amplifier, as well as the temperature.

7. An optical amplifier having a plurality of rare earth doped optical fibers in a multi-stage, comprising:

one or more externally controllable optical variable attenuator means, wherein an optical attenuation amount of said optical variable attenuator means is varied with intensity of input optical signal to the optical amplifier and intensity of output optical signal from the optical amplifier, and wherein an optical fiber amplifier in a first stage is subjected to pumping light intensity constant control or pumping current constant control, and optical fiber amplifiers in stages other than said first and last stages are subjected to any control other than gain constant control, and gain spectrum of the entire optical amplifier is made constant by controlling an optical fiber amplifier in said last stage and said optical variable attenuator means between the optical fiber amplifier stages.

8. An optical amplifier according to claim 7, further comprising an optical attenuation amount table of the optical variable attenuator means associated with the intensity of the input optical signal to the optical amplifier and the intensity of the output optical signal from the optical amplifier, and the optical attenuation amount is changed in accordance with said table.

9. An optical amplifier according to claim 8, wherein a relationship between the intensity of the input optical signal to the optical amplifier, intensity of the output optical signal from the optical amplifier and optical attenuation amount of said optical variable attenuator means is represented by "optical attenuation amount=coefficient A×(intensity of output optical signal from the optical amplifier−intensity of input optical signal to the optical amplifier) [dB]+any coefficient", and the coefficient A has a value within a range from −0.8 [dB/dB] to −1.1 [dB/dB].

10. An optical amplifier comprising:

first and second rare earth doped optical fibers provided in first and second amplifying stages of the optical amplifier, respectively;

at least one optical variable attenuator provided between the first and second rare earth doped optical fibers; and an attenuation amount controller configured to control the optical variable attenuator to adjust an optical attenuation amount of said optical variable attenuator on the basis of a value which represents temperature of at least one of the first and second rare earth doped optical fibers to compensate fluctuation of gain property of the optical amplifier.

11. An optical amplifier comprising:

first and second rare earth doped optical fibers provided in first and second amplifying stages of the optical amplifier, respectively;

a replaceable optical part provided between the first and second rare earth doped optical fibers;

at least one optical variable attenuator provided between the first and second rare earth doped optical fibers; and an attenuation amount controller configured to control the optical variable attenuator to adjust an optical attenuation amount of said optical variable attenuator on the basis of a value which represents temperature of at least one of the first and second rare earth doped optical fibers to compensate fluctuation of gain property of the optical amplifier.

12. An optical amplifier according to claim 10, wherein said attenuation amount controller has an optical attenuation amount table associated with the temperature, and wherein the optical attenuation amount of said optical variable attenuator is changed on the basis of said optical attenuation amount table.

13. An optical amplifier according to claim 12, wherein, when an equation obtained by applying a regression line based on a method of least squares to said optical attenuation amount table is represented by "optical attenuation amount= coefficient A [dB/° C.]×temperature [° C.]+any coefficient", the coefficient A is selected to be within a range from −0.16 [dB/° C.] to +0.26 [dB/° C.].

14. An optical amplifier according to claim 12, wherein a wavelength band of optical signal inputted to the optical amplifier includes 1580 nm to 1590 nm, and, when an equation obtained by applying a regression line based on a method of least squares to said optical attenuation amount table is represented by "optical attenuation amount= coefficient A [dB/° C.]×temperature [° C.]+any coefficient", the coefficient A is selected to be within a range from −0.16 [dB/° C.] to −0.04 [dB/° C.].

15. An optical amplifier according to claim 11, wherein said attenuation amount controller adjusts the optical attenuation amount of said optical variable attenuator by using one or plural or all of intensity of input optical signal to the optical amplifier, an insertion loss amount of said replaceable optical part and intensity of output optical signal from the optical amplifier, as well as the temperature.

16. An optical amplifier comprising:

first and second rare earth doped optical fibers provided in first and second amplifying stages of the optical amplifier, respectively;

at least one externally controllable optical variable attenuator provided between the first and second rare earth doped optical fibers;

an attenuation amount controller configured to control the optical variable attenuator to adjust an optical attenuation amount of said optical variable attenuator on the basis of intensity of input optical signal to the optical amplifier and intensity of output optical signal from the optical amplifier; and an optical attenuation amount table of the optical variable attenuator associated with the intensity of the input optical signal to the optical amplifier and the intensity of the output optical signal from the optical amplifier, and the optical attenuation amount is changed in accordance with said table.

17. An optical amplifier according to claim 16, wherein a relationship among the intensity of the input optical signal to the optical amplifier, the intensity of the output optical signal from the optical amplifier and the optical attenuation amount of said optical variable attenuator is represented by "optical attenuation amount=coefficient A×(intensity of output optical signal from the optical amplifier−intensity of input optical signal to the optical amplifier) [dB]+any coefficient", and the coefficient A has a value within a range from −0.8 [dB/dB] to −1.1 [dB/dB].

* * * * *

UNITED STATES PATENT AND TRADEMARK OFFICE
CERTIFICATE OF CORRECTION

PATENT NO. : 6,411,430 B1 Page 1 of 1
DATED : June 25, 2002
INVENTOR(S) : Ogino et al.

It is certified that error appears in the above-identified patent and that said Letters Patent is hereby corrected as shown below:

<u>Title page,</u>
Item [30], Foreign Application Priority Data, has been omitted.

Item [30] should read:

-- [30]   Foreign Application Priority Data
Oct. 4, 1998   (JP) ...............................10-296115
Oct. 4, 1998   (JP) ...............................10-296116 --

Signed and Sealed this

Twenty-fourth Day of December, 2002

JAMES E. ROGAN
*Director of the United States Patent and Trademark Office*